United States Patent
Iizuka

[19]

[11] Patent Number: 6,160,949
[45] Date of Patent: *Dec. 12, 2000

[54] VIDEO SIGNAL REPRODUCTION APPARATUS FOR CHROMINANCE SIGNALS

[75] Inventor: Hiroshi Iizuka, Ora-gun, Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/969,410

[22] Filed: Nov. 7, 1997

Related U.S. Application Data

[62] Division of application No. 08/841,083, Apr. 29, 1997, Pat. No. 5,845,040, which is a continuation of application No. 08/459,465, Jun. 2, 1995, abandoned.

[30] Foreign Application Priority Data

| Jun. 30, 1994 | [JP] | Japan | 6-149867 |
| Jun. 30, 1994 | [JP] | Japan | 6-149883 |
| Jul. 11, 1994 | [JP] | Japan | 6-158896 |
| Apr. 28, 1995 | [JP] | Japan | 7-105408 |

[51] Int. Cl.[7] .................................................... H04N 9/80
[52] U.S. Cl. .................................. 386/28; 386/44; 386/41
[58] Field of Search ................................ 386/26, 28, 44, 386/41, 21, 22, 25, 18, 19, 13, 10, 17, 85, 89, 113; 360/61; H04N 9/80

[56] References Cited

U.S. PATENT DOCUMENTS

| 3,619,491 | 11/1971 | Fujita . |
| 3,953,882 | 4/1976 | Arimura et al. . |
| 3,974,520 | 8/1976 | Kuroyanagi . |
| 4,178,606 | 12/1979 | Hirota . |
| 4,236,173 | 11/1980 | Bierhoff et al. . |
| 4,612,585 | 9/1986 | Takase et al. . |
| 4,881,134 | 11/1989 | Grothans et al. . |
| 5,083,213 | 1/1992 | Yasuda . |

FOREIGN PATENT DOCUMENTS

| 0284768 | 10/1988 | European Pat. Off. . |
| 0396362 | 11/1990 | European Pat. Off. . |
| 0429926 | 6/1991 | European Pat. Off. . |
| 0429945 | 6/1991 | European Pat. Off. . |
| 0476922 | 3/1992 | European Pat. Off. . |
| 0546440 | 6/1993 | European Pat. Off. . |
| 2856634 | 7/1979 | Germany . |
| 60-253395 | 12/1985 | Japan . |

*Primary Examiner*—Young Lee
*Attorney, Agent, or Firm*—Hogan & Hartson, LLP

[57] ABSTRACT

A video signal reproduction apparatus reproduces a chrominance signal which has been converted to a low frequency band and recorded on a magnetic tape. The low frequency chrominance signal read out from the magnetic tape is first subjected to phase recovery processing. Then, frequency conversion is carried out for the phase recovered chrominance signal to generate a reproduced chrominance signal. Thus, phase recovery is carried out prior to frequency conversion, and an oscillation signal can be directly supplied to the frequency converter from a voltage controlled oscillator in a phase controller, thereby achieving an accurate frequency conversion. This structure allows an extra frequency converter or a complicated band pass filter to be omitted.

8 Claims, 23 Drawing Sheets

| LINE \ COLOR ROTARY (FIELD) | L n-1 FIELD | H n FIELD |
|---|---|---|
| m-4 | 1 | 1 |
| m-3 | 4 | 2 |
| m-2 | 3 | 3 |
| m-1 | 2 | 4 |
| m | 1 | 1 |
| m+1 | 4 | 2 |
| m+2 | 3 | 3 |
| m+3 | 2 | 4 |
| m+4 | 1 | 1 |

Fig. 8

Fig. 11        Fig. 12
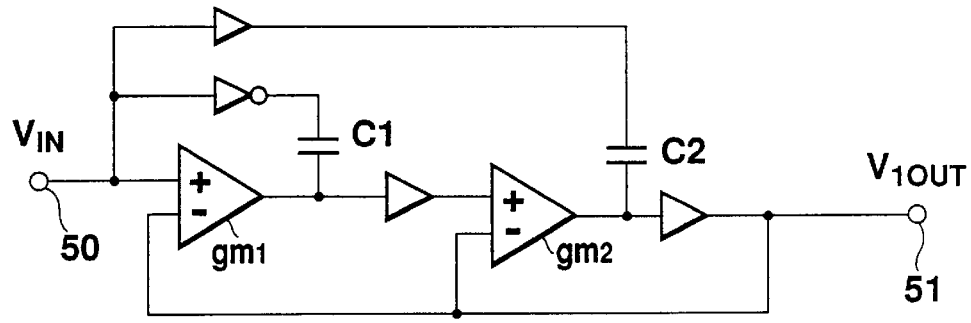
Fig. 13
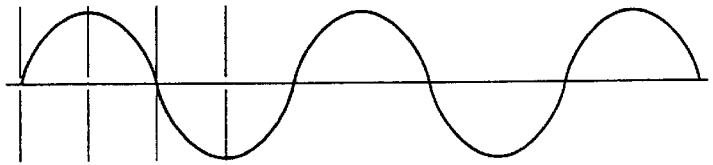
Fig. 14A $V_{IN}$
Fig. 14B $V_A$
DATA MISSING DURATION
Fig. 14C $V_H$
Fig. 14D $V_{3OUT}$
t1  t2

Fig. 18A V<sub>IN</sub> 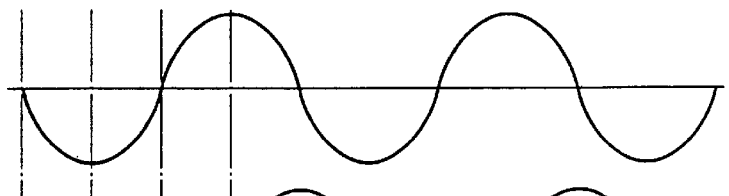
Fig. 18B V<sub>A</sub> 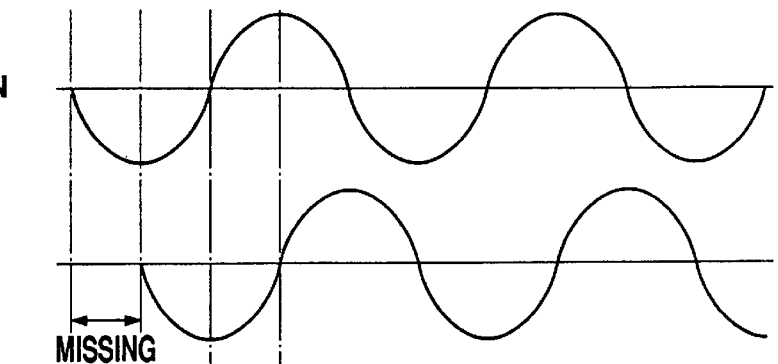
MISSING DATA DURATION
Fig. 18C V<sub>H</sub> 
Fig. 18D V<sub>3OUT</sub> 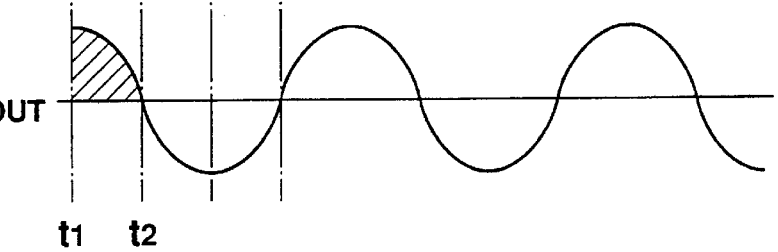
t1  t2

| COLOR ROTARY (FIELD) / LINE | L(n-1 FIELD) | | H (n FIELD) | |
| --- | --- | --- | --- | --- |
| | FIRST SW | SECOND SW | FIRST SW | SECOND SW |
| m-4 | 4 | 1 | 4 | 1 |
| m-3 | 4 | 1 | 1 | 2 |
| m-2 | 4 | 1 | 2 | 3 |
| m-1 | 4 | 1 | 3 | 4 |
| m | 4 | 1 | 4 | 1 |
| m+1 | 4 | 1 | 1 | 2 |
| m+2 | 4 | 1 | 2 | 3 |
| m+3 | 4 | 1 | 3 | 4 |
| m+4 | 4 | 1 | 4 | 1 |

Fig. 24

VIDEO SIGNAL REPRODUCTION APPARATUS FOR CHROMINANCE SIGNALS

This is a division application of application Ser. No. 08/841,083 filed Apr. 29, 1997 now U.S. Pat. No. 5,845,040, which is a continuation of application Ser. No. 08/459,465 filed Jun. 2, 1995 now abandoned.

BACKGROUND OF THE INVENTION

1. Field of the Invention

This invention relates to a video signal reproduction circuit for reproducing a chrominance signal used for a VTR for home (consumer) use, and more particularly to a video signal reproduction circuit for NTSC or PAL formats in which the number of elements is reduced.

2. Description of the Related Art

FIG. 1 shows a conventional structure of a circuit for reproducing a chrominance signal which has been converted into a low frequency band and recorded on a magnetic tape (not shown). A signal read out from the magnetic tape is input through an input terminal 1 to a low pass filter (LPF) 2 for extracting only a frequency component of 629 kHz in the case of NTSC format or a frequency component of 627 kHZ in the case of PAL format, which is then input to an automatic chroma control circuit (ACC circuit) 3 for level adjustment.

The level adjusted chrominance signal is applied to a first frequency conversion circuit 4, and is converted to a frequency of 3.58 MHz for NTSC format or to a frequency of 4.43 MHz for PAL format, which is then fed via a band pass filter (BPF) 5 to a comb filter 6 to any remove noise components before being output from the output terminal 7.

The chrominance signal output from the BPF 5 is also applied to a burst gate circuit to extract only a burst component, which is then fed to an automatic phase control (APC) circuit 9. In the APC circuit 9, the phase of the burst signal is compared with the phase of an oscillation signal output from a fixed type oscillator 10 (3.58 MHz or 4.43 MHz). The difference between the phases of the two signals is output from the APC circuit as a comparison error voltage, and is applied to a VCO 11 to control the oscillation frequency of the VCO 11 (320 fH for NTSC and 321 fH for PAL: fH is a horizonal synchronizing frequency).

The output of the VCO 11 having a frequency of 320 fH or 321 fH is applied to a phase recovery circuit (a phase shifter) 12 to generate four signals (40 fH for NTSC, 40.125 fH for PAL), the phases of which are shifted with respect to one another by 90 degrees in response to a horizontal synchronizing signal, input via a terminal 13 and having a frequency of fH, and a color rotary pulse from a terminal 14. The phase recovery circuit 12 is switched to successively output four signals every 1 H period (H: horizontal synchronizing period), thereby recovering the phase of the chrominance signal which was converted to a low frequency band and recorded on the magnetic tape.

The output from the phase recovery circuit 12 (40 fH or 40.125 fH), as well as an oscillation signal (3.58 MHz or 4.43 MHz) from the oscillation circuit 10, are supplied to a second frequency conversion circuit 15, in which an addition and a difference of the two signals (from the phase recovery circuit 14 and the oscillation circuit 10) are obtained. Only the addition component of the two signals is supplied through a band pass filter 16 to the first frequency conversion circuit 4, thereby obtaining 3.58 MHz (for NTSC format) or 4.43 MHz (for PAL format) signal.

JP-A-60-253395 (Japanese Patent Laid-Open No. Sho 60-253395) discloses digital recovering of the phase of a low frequency band chrominance signal which is supplied to the first frequency conversion circuit. Such an NTSC format digital reproducing circuit for a chrominance signal is shown in FIG. 2. The chrominance signal is input via an input terminal 100 to a low pass filter 102 to extract a chrominance signal of less than 630 Hz (e.g. 629 kHz), which is then applied to the A/D converter 103. Meanwhile, a horizontal synchronizing signal fH is applied via an input terminal 104 to a multiplier 105 and is multiplied by 320 in order to sample a 40 fH Hz chrominance signal for every 45 degrees. The output from the multiplier 105 having a frequency of 320 fH is supplied, as a clock pulse, to the A/D converter 103. The digitally converted chrominance signal (629 kHz) is input to the 1 H memory 106 consisting of 6 bit RAM. This signal is written in the address designated by the address counter 107, and is read out after a 1 H (horizontal synchronizing signal) period by the readout address counter 108.

The write address counter 107 is reset by a horizontal synchronizing signal fH, and counts a signal having a frequency of 320 fH to designate the address in the 1 H memory 106.

The readout address counter 108 is reset by an output of the phase shift commander 109, and counts a 320 fH signal from the multiplier 110 to designate the readout address of the 1 H memory 106.

The VXO 111 oscillates at (455/2)fH=3.58 MHz, and the oscillation signal is divided by 2/445 by the divider 112 and multiplied by 320 by the multiplier 110 to provide a signal having a frequency of 320 fH.

Readout timing of the 1 H memory 106, which is responsive to the output of the phase shift commander 109, is shifted every 1 H by a ¼ cycling period of the low frequency chrominance signal (that is, 90°), thereby carrying out the phase recovery of the low frequency chrominance signal.

The phase recovery processing is described in more detail with reference to FIG. 3 which shows write/readout clock and the corresponding waveforms. In this figure, the low frequency chrominance signal is in the odd numbered field where the phase is delayed by 90 degrees every 1 H, and the explanation of the phase shift in the even numbered field will be omitted. In FIG. 3, signal (a) is a write clock for the 1 H memory 106, while signal (c) is a readout clock for the 1 H memory 106. Signal (b) is an input digital signal to the 1 H memory 106, and signal (d) is an output digital signal of the 1 H memory 106. The signals (b) and (d) are depicted in analogue form in the figure for convenience of the explanation.

During a 1 H period where the phase shift amount is 0°, signal (b) is successively written in the 1 H memory in response to a signal (a) (i.e. writing clock) as from the address 0 of the 1 H memory 106. Readout of this signal, which has 0° of phase shift, is carried out by the readout counter 108 which is reset to "0" in response to the output of the phase shift commander 109. More particularly, data is read out responsive to the clock represented as signal (c) as from the address 0 of the 1 H memory 106.

Then, during the next 1 H period, signal (b) which is delayed by 90° is successively written into the 1 H memory 106 from the address 0. The data is read out by shifting the phase by 90° to recover the proper phase. More particularly, the readout counter 108 is preset to "2" by the phase shift commander 109 to read out the data from the address 2, as is shown by signal (c). Thus, the phase of the signal is advanced by 90 degree by reading out from the address 2, thereby obtaining a continuous original signal, without discontinuity between the first 1 H period and the next 1 H period, as is shown by signal (d).

In the same manner, during the next 1 H period, the signal (b) which is delayed by 180° is written from the address 0, and the data is read out as from the address 4 to advance the phase by 180°, thereby recovering the continuous original signal. Setting the starting of the readout address is carried out by the address counter 108 which is reset to a predetermined value in response to the output of the phase shift commander 109. As a result, the phase recovered low frequency chrominance signal is generated from the 1 H memory 106, as is depicted by signal (d).

The thus phase recovered low frequency chrominance signal is applied to the comb filter 115 consisting of the 1 H memory 113 and the adder 114 for removing any crosstalk components, and is further applied to the D/A converter 116 to be converted to the analogue signal, which is then fed to the main converter 117 to be recovered to a 3.58 MHz chrominance signal.

However, in the structure shown in FIG. 1, since the four signals generated by the phase recovery circuit 12, the phases of which are shifted from one another by 90°, are applied via the second frequency conversion circuit 15 to the first frequency conversion circuit 4, a band pass filter 16 of complicated structure is required. Furthermore, the number of elements is increased because of the structure having two frequency converters.

On the other hand, in the structure shown in FIG. 2, the chrominance signal converted to a low frequency band is directly subjected to the phase recovery processing, and therefore, the band pass filter 119 of simple structure is only provided between the main converter 117 and the sub converter 118. However, in this structure, the phase recovery is carried out by delaying (or advancing) the readout timing from the memory, and the low frequency chrominance signal is shifted by 45° between the adjacent two 1 H periods, which results in insufficient removal of the crosstalk in the comb filter 115. This is indicated by the dashed lines A and B at the end of the 1 H period of +90° and +180°. In other words, in the readout operation by clock signal (c), no data is read out for the last time period of the 1 H period, which corresponds to the time period which has been skipped at the first portion of the 1 H period, resulting in lack of data. Such a time period lacking data is generated every perpendicular period, causing a deterioration of image quality.

The reason why the phase error of 45° is caused will now be described. Time lag T1 between the input and output of the 1 H memory 113 is originally $1/f_H$. However, when ¼ period ($\Delta T$=(¼) * (1/40 $f_H$) 1/160 $f_H$) is shifted, the time lag T2 becomes ($1/f_H$) +(1/160 $f_H$) ($^{161}/_{161}$ $f_H$). Then, the transfer function H ($\omega$) is represented by the following equation.

$$H(\omega) = \left(1 + e^{-s\frac{161}{160 f_H}}\right) \quad (1)$$

where, s=j$\omega$. This equation (1) can be transformed to;

$$H(\omega) = e^{-s\frac{161}{320 f_H}} \left(e^{s\frac{161}{320 f_H}} + e^{-s\frac{161}{320 f_H}}\right) \quad (2)$$

The equation (2) is further transformed using Euler's formula as follows.

$$|H(\omega)| = \left|2\cos\omega \frac{161}{320 f_H}\right| \quad (3)$$

By substituting $2\pi f_H$ for $\omega$, the following equation is obtained.

$$|H(\omega)| = |2 \cos (40 \pi + \pi/4)| \quad (4)$$

"$\pi/4$" in the equation (4) indicates that the notch of the comb filter for the interleaved chorominance signal is offset by $\pi/4$ in the vicinity of 629 KHz, which is shown in FIG. 4. The solid line indicates ideal frequency characteristics of a comb filter, wherein the maximum level of signal can pass at 629 KHz (=40 $f_H$ ) and a luminance component is removed at attenuation points generated symmetrically about 629 KHz at cycles of $f_H$ (horizontal synchronizing frequency).

On the contrary, when a phase difference of 45° is caused, the frequency characteristic of the comb filter is shifted as is indicated by dashed line, which means that a 629 KHz signal can not pass at its maximum level nor can removal of luminance component be achieved.

SUMMARY OF THE INVENTION

This invention was conceived in order to overcome the above mentioned problems, and its object is to provide a video signal reproducing apparatus which has a simple structure and is capable of accurately reproducing a chrominance signal converted to low frequency band.

The video signal reproducing apparatus in accordance with the invention comprises a phase recovery circuit for recovering the phase of a low frequency chrominance signal, which has been read out from the magnetic tape and inputted thereto, to generate a phase recovered chrominance signal, and a frequency conversion circuit for frequency-converting the phase recovered chrominance signal into a reproduced chrominance signal.

The video signal reproducing apparatus further comprises an oscillator which oscillates at a burst signal frequency, and a phase controller. The phase controller includes a phase comparator for comparing the phase of the oscillation signal and the phase of the burst component of the reproduced chrominance signal, a filter for smoothing the comparison signal output from the phase comparator, and a voltage controlled oscillator for controlling the oscillation frequency so as to vary in response to the output from the filter. The oscillation signal output from the voltage controlled oscillator controls the frequency conversion processing of the frequency conversion circuit.

The video signal reproducing apparatus further comprises a comb filter for removing noise components.

Thus, since, in this apparatus, the phase of the low frequency chrominance signal is recovered prior to frequency conversion, frequency conversion processing by the frequency converter can be accurately controlled by supplying an oscillation signal output from the voltage controlled oscillator in the phase controller. In this structure, an extra frequency conversion circuit or band pass filter having a complicated configuration can be omitted. Also, the comb filter can be simply constructed.

In another aspect of the invention, a video signal reproduction apparatus comprises a phase recovery circuit for recovering the phase of a low frequency chrominance signal, which has been read out from a magnetic tape and input thereto, to generate a phase recovered chrominance signal, a comb filter for removing noise components from the phase recovered chrominance signal, and a frequency converter for frequency-converting the phase recovered chrominance signal, which has been passed through the comb filter, to generate a reproduced chrominance signal.

The comb filter includes a delay circuit for delaying the phase recovered chrominance signal by 1 horizontal synchronizing period or 2 horizontal synchronizing periods, and a mixer circuit for mixing the phase recovered chrominance signal supplied from the phase recovery circuit and the delayed chrominance signal.

By recovering the phase of the low pass filtered chrominance signal prior to frequency conversion, the comb filter can be simply constructed so as to include only a delay circuit and a mixer circuit. Furthermore, noise components of the phase recovered chrominance signal are removed by the comb filter before converting to a high frequency band, which allows the clock rate of the clock signal supplied to the delay circuit of the comb filter to be slower and makes the structure of the apparatus simple. Precision of the reproduction of the chrominance signal is also improved.

The phase recovery circuit includes four phase shifters, (that is, a 0° phase shifter for shifting the phase of the output signal from the input signal, a 90° phase shifter, a 180° phase shifter, and a 270° phase shifter) and a switch circuit for switching the four phase shifters.

The switching of the four phase shifters is carried out in response to a color rotary pulse and a horizontal synchronizing signal. The switch circuit is connected to both the delay circuit for delaying the input signal by 1 horizontal synchronizing period and the mixer circuit. This structure can properly reproduce the signal which has been converted to a low frequency band and recorded on the magnetic tape as an NTSC formatted chrominance signal.

An alternative structure of the switch circuit includes first and second switches for switching the four phase filters responsive to a color rotary pulse and a horizontal synchronizing signal, one of which is connected to the mixer circuit, and the other is connected to the delay circuit for delaying the input signal by 2 horizontal synchronizing periods. This structure can properly reproduce the signal which has been converted to a low frequency band and recorded on the magnetic tape as a PAL formatted chrominance signal.

The 270° phase shifter comprises an input terminal for inputting the signal, a first amplifier receiving the input signal at its positive input terminal, an inverter and a first capacitor connected in series between the input terminal of the phase shifter and the output terminal of the first amplifier, a second amplifier receiving the output signal from the first amplifier at its positive input terminal, a second capacitor connected between the input terminal of the phase shifter and the output terminal of the second amplifier, a return path for returning the output signal from the second amplifier to the negative input terminals of the first and second amplifier, and an output terminal of the phase shifter outputting, from the output terminal of the first amplifier, a signal whose phase is delayed by 90° compared to the input signal.

The 90° phase shifter comprises an input terminal, a first amplifier receiving an inverted input signal from the input terminal at its positive input terminal, a first capacitor connected between the phase shifter input terminal and the output terminal of the first capacitor, a second amplifier receiving the output signal of the first amplifier at its positive input terminal, an inverter and a second capacitor connected in series between the input terminal of the phase shifter and the output terminal of the second amplifier, a return path for returning the output signal from the second amplifier to the negative input terminals of the first and second amplifiers, and an output terminal of the phase shifter outputting, from the output terminal of the first amplifier, a signal whose phase is advanced by 90°.

The 180° phase shifter comprises an inverter circuit for inverting the input signal.

The 90° phase shifter and the 270° phase shifter have a phase shift function (ability) to delay the phase of the input signal supplied to the input terminal of the first amplifier, and a high pass filtering function (ability) to pass the differential of the input signal at the early stage.

By constructing the respective phase shifters as described above, no time delay is generated in the output signal even if the phase of the low frequency chrominance signal supplied to the phase recovery circuit is shifted. For this reason, immediately after the low frequency chrominance signal is applied to the respective phase shifter, an output signal whose phase is accurately shifted (that is, a phase recovered chrominance signal) can be obtained. Furthermore, noise components can be reliably removed from the phase recovered chrominance signal by the comb filter at the later process. The frequency characteristics of each of the phase shifters is flat, and therefore, the input chrominance signal having a predetermined frequency width is not subject to fluctuation.

BRIEF DESCRIPTION OF THE DRAWINGS

In the accompanying drawings:

FIG. 8 is a table for explaining the operation of the phase recovery circuit shown in FIG. 5;

FIG. 11 shows an example of the 0° phase shifter circuit shown in FIG. 5;

FIG. 12 shows an example of the 180° phase shifter circuit shown in FIG. 5;

FIG. 13 shows an example of an APF (all pass filter), FIG. 14A shows a waveform of the input signal to the APF of FIG. 13;

FIG. 14B shows a waveform of the output signal from the APF shown in FIG. 13;

FIG. 14C shows a waveform of the output signal from the H PF (in the 270° phase shifter) shown in FIG. 17;

FIG. 14D shows a waveform of the output signal from the 270° phase shifter shown in FIGS. 15 and 17;

FIG. 18A shows a waveform of the input signal to the 90° phase shifter shown in FIG. 16;

FIG. 18B shows a waveform of the output signal from the second amplifier of the 90° phase shifter shown in FIG. 16;

FIG. 18C shows a waveform of the output signal from the H PF of the 90° phase shifter shown in FIG. 16;

FIG. 18D shows a waveform of the output signal from the 90° phase shifter shown in FIG. 16;

FIG. 24 is a table for explaining the operation of the phase recovery circuit shown in FIG. 21 (third embodiment);

DETAILED DESCRIPTION OF THE PREFERRED EMBODIMENT

First Embodiment

Figure 5:
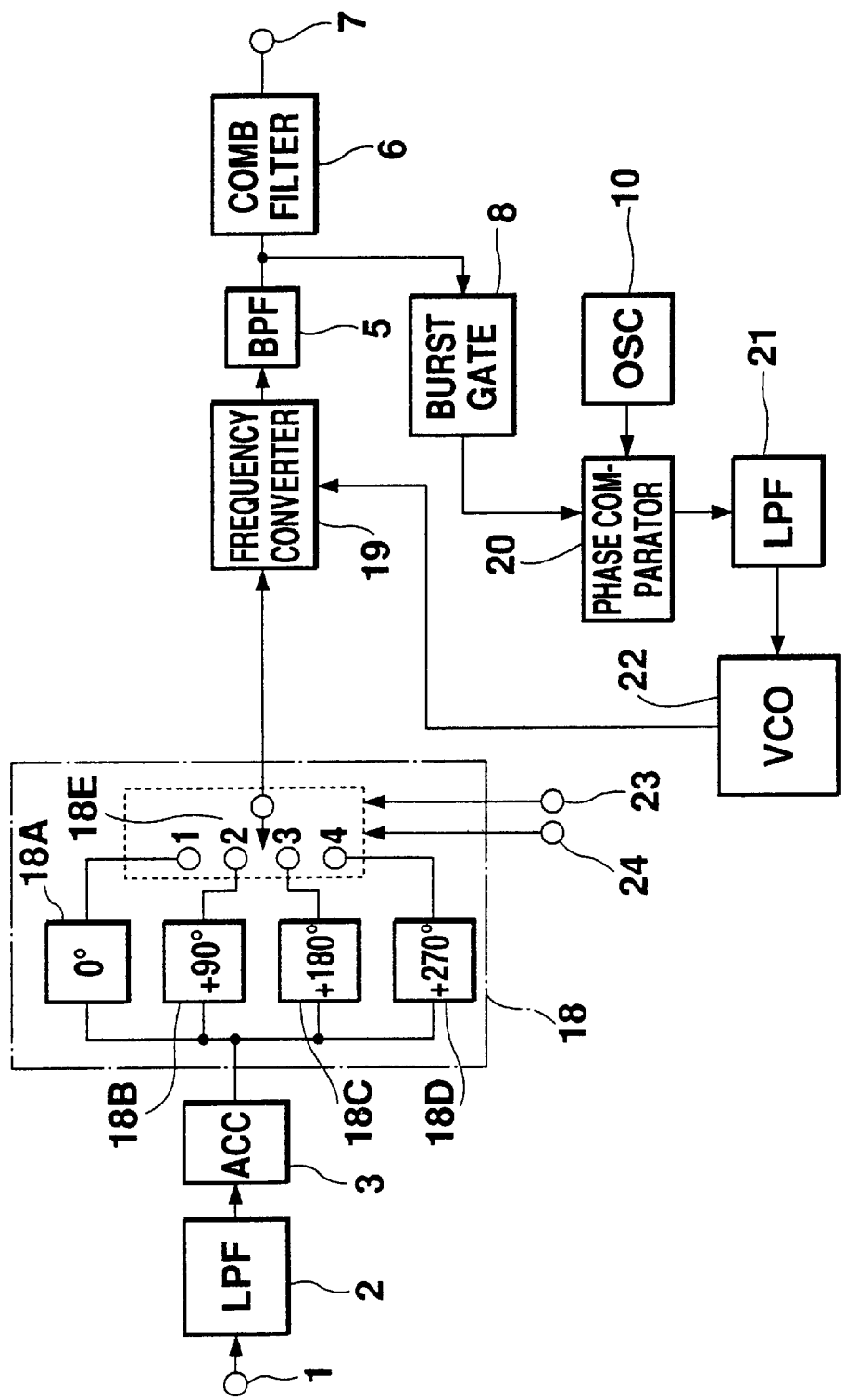
FIG. 5 is a block diagram showing a structure of a video signal reproduction circuit in accordance with the present invention.

FIG. 5 shows a video signal reproduction circuit in accordance with the first embodiment of the invention, which includes a phase recovery circuit (a phase shifter) 18 for recovering the phase of a low-frequency converted chrominance signal, comprising a 0° phase shifter 18A, a 90° phase shifter 18B, a 180° phase shifter 18C, a 270° phase shifter, and a switch 18E. The circuit further includes a frequency conversion circuit 19 for converting the frequency of the output signal of the phase recovery circuit 18, a phase comparator 20 for comparing the oscillation signal (3.58 MHz) output from a fixed oscillator circuit 10 and the output of a burst extraction circuit 8, an LPF 22 for smoothing the output of the phase comparator 20, and a voltage controlled oscillator (VCO) 22 for varying the oscillating frequency (4.21 MHz) in response to the output of the LPF 21.

The same numeral assigned to an element indicates the same element.

A low frequency chrominance signal is input via an input terminal 1 to an LPF 2, by which a chrominance component (629 KHz) is extracted. The low pass filtered chrominance signal is fed to an automatic chrominance controller (ACC) 3 for level adjustment, and is then applied to the phase recovery circuit 18 for recovering the phase rotated during the recording.

Figure 6:
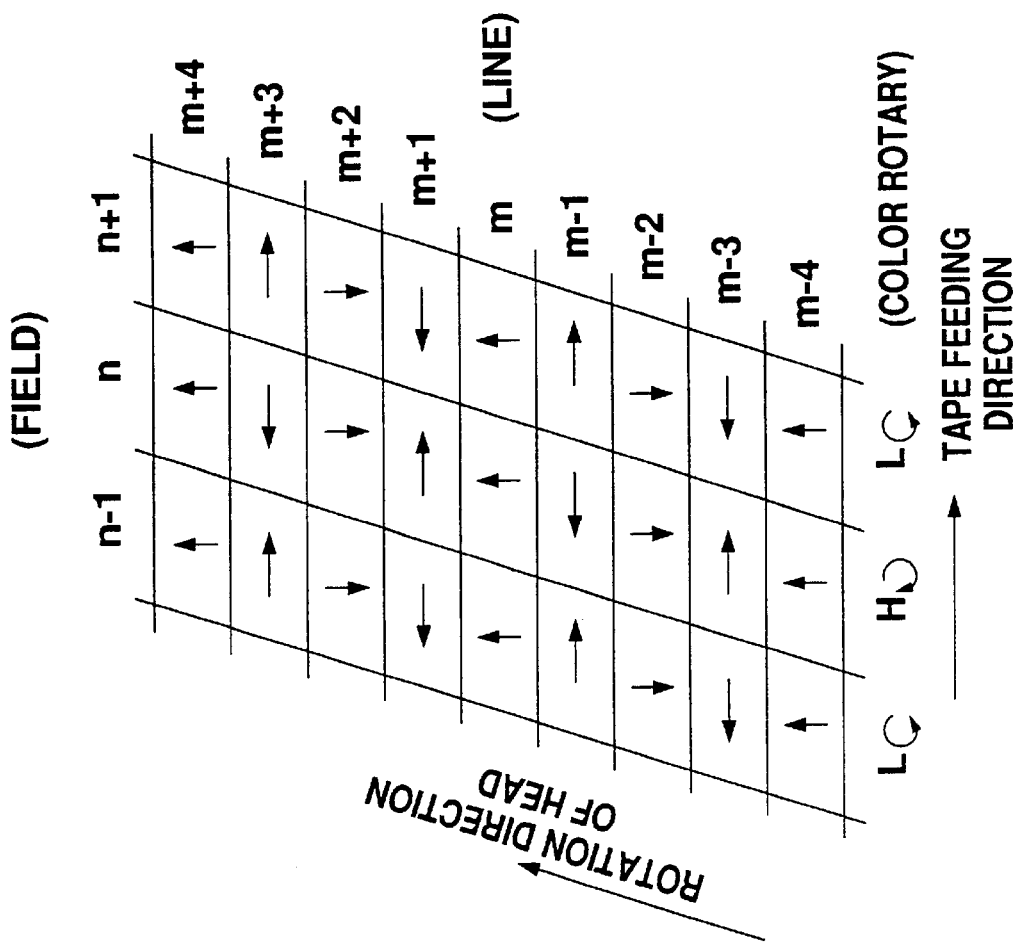
FIG. 6 indicates the phases of the chrominance signal converted to a low frequency band and recorded on the magnetic tape, using vectors.

The phase of the low frequency chrominance signal which is recorded on the magnetic tape is shown by vectors in FIG. 6. The phase of data in each field is rotated by 90° every 1 H period in the direction of record head rotation. The phase rotating direction is opposite depending on the polarity of a color rotary pulse (H, L).

Figure 7:
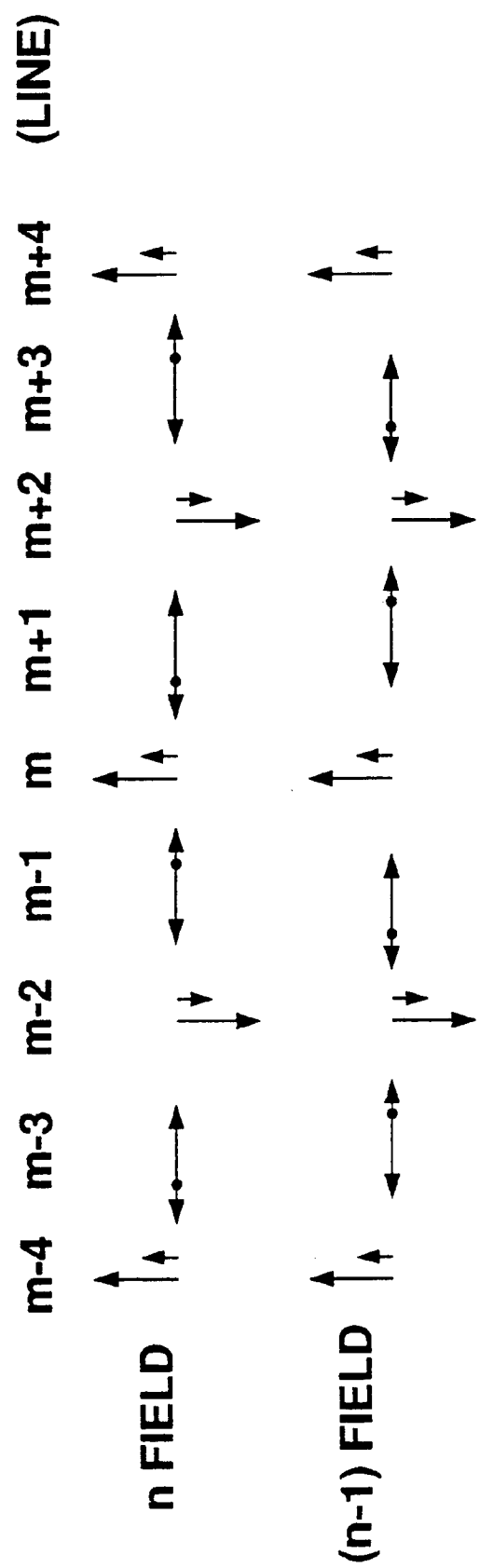
FIG. 7 shows the phase vector of the low frequency chrominance signal of FIG. 6 in more detail.

In FIG. 7, vectors of the chrominance signals are illustrated together with the crosstalk components for (n−1) field and n field between the (m−4)th line and the (m+4)th line. The small arrows represent adjacent crosstalk components. In the "n" field, the signal is delayed by 90° per 1 H period, where the color rotary pulse is "H". In the (n−1) field, the signal is advanced by 900 per 1 H period, where the color pulse is "L". The color rotary pulse is supplied to the terminal 23 to direct the switching direction of the switch 18E, while a horizontal synchronizing signal is supplied to the terminal 24 to set the switching period of the switch 18E to 1 H.

FIG. 8 shows the switching state of the switch 18E. In the n field where the color rotary pulse is "H", the switch terminal 1 of the switch 18E is selected for (m−4)th line to operate the 0° phase shifter 18A, whereby the vector of a phase recovered chrominance signal which has passed through the phase recovery circuit 18 directs upward (90°) at line (m−4) in the "n" field, as is shown in FIG. 9.

For the next line (that is, for the (m−3)th line in the n field), the switch terminal 2 is selected to operate the 90° phase shifter 18B, whereby the vector of the phase recovered chrominance signal directs upward (90°). Similarly, for the (m−2)th line in the n field, the switch terminal 3 is selected to operate the 180° phase shifter, whereby the vector of the phase recovered chrominance signal directs upward (90°) as is shown in FIG. 9. Thus, the switch terminals are selected in the 5order of 4→1→2→3→4. By switching the four phase shifters in this manner, all the vectors of chrominance signals in the "n" field, which have passed through the phase recovery circuit, direct in the same direction (90°), and phase recovery is completed.

Figure 9:
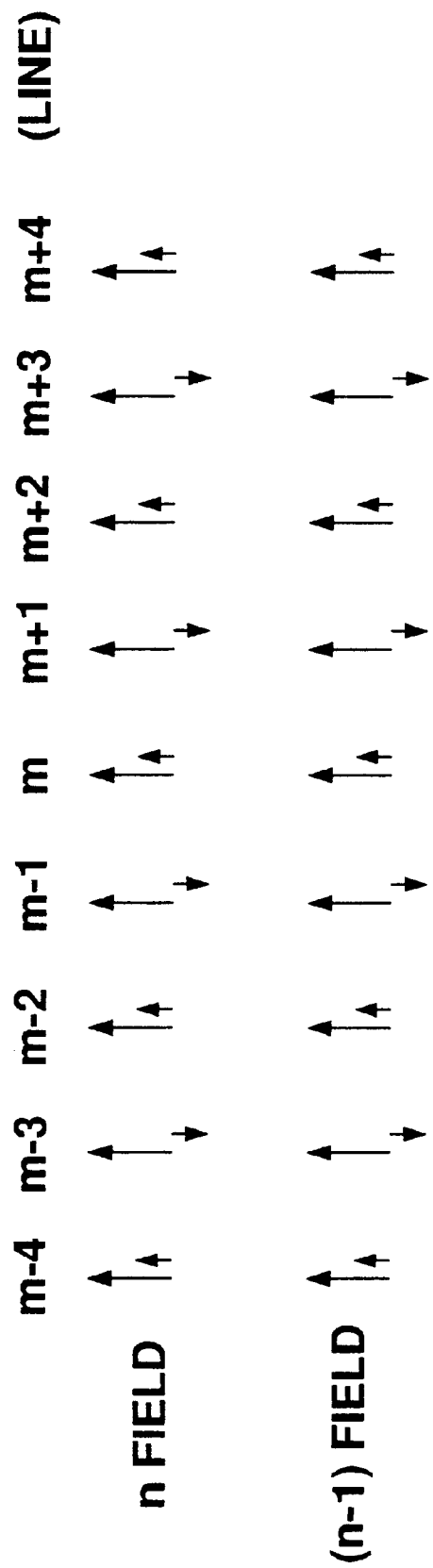
FIG. 9 shows vectors of the phase recovered chrominance signal in accordance with the present invention.

While, in the (n−1) field where the color rotary pulse is "L", the switch terminal 1 is selected for the (m−4)th line to operate the 0° phase shifter 18A, whereby the vector of the chrominance signal which has passed through the phase recovery circuit 18 directs upward (90°) as is shown in FIG. 9. Then, for the (m−3)th line, the switch terminal 4 is selected to operate the 270° phase shifter 18D, whereby the vector of the phase recovered chrominance signal directs upward (90°). The switching of the four phase shifters is successively carried out in the order 1→4→3→2→1 in the (n−1) field, and all the vectors of chrominance signals, which have passed the phase recovery circuit 18, direct upward (90°). Thus, the phase recovery of the low frequency chrominance signal is completed.

In this manner, phase recovery is carried out by the phase recovery circuit 18 prior to frequency conversion of the low frequency chrominance signal, and therefore it is not necessary for the frequency conversion circuit 19 to conduct phase recovery. Only frequency conversion is carried out using a single frequency (4.21 MHz) by the frequency converter 19, which means that an oscillation signal output from the VCO 22, which oscillates at 4.21 MHz, can be directly applied to the frequency conversion circuit 19.

The chrominance signal which has been converted to 3.58 MHz is applied via the BPF 5 to the burst extraction circuit 8 for extracting only a burst component. The burst signal is applied to the phase comparator 20, in which the burst signal is compared with the oscillation signal (3.58 MHz) from the fixed oscillator circuit 10 for the phase comparison. A comparison error voltage is generated on the basis of the phase difference between the two signals, and is applied to the VCO 22 to control the oscillation frequency of the VCO 22, thereby carrying out frequency conversion stably.

Figure 10:
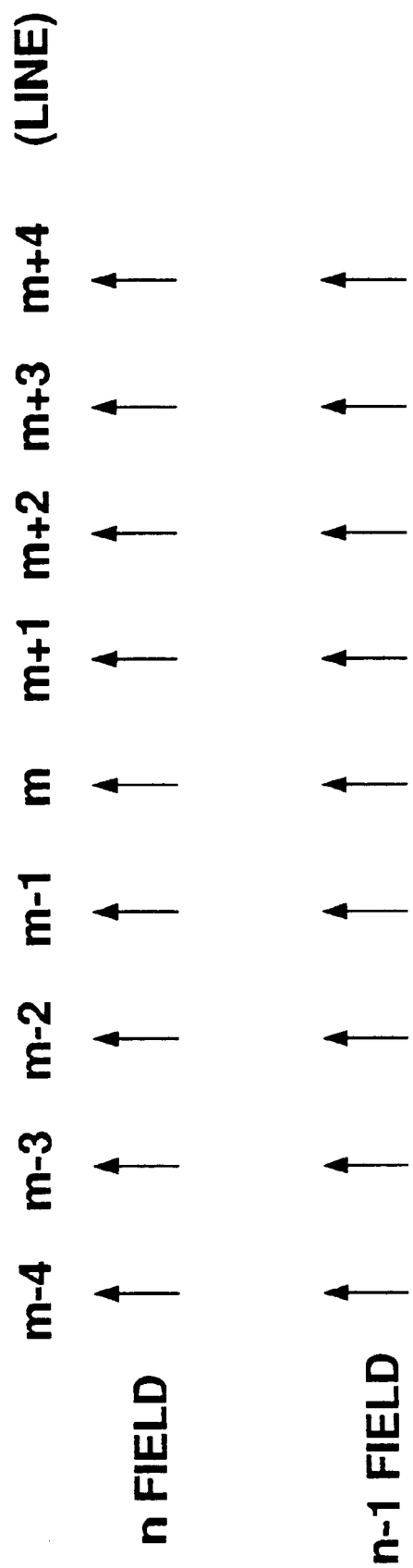
FIG. 10 shows vectors of the chrominance signal which has passed the comb filter in accordance with the invention.

The chrominance signal which has been subjected to phase recovery and has been converted to 3.58 MHz is also applied to the comb filter 6 to remove any crosstalk component. The comb filter includes a delay circuit for delaying the reproduced chrominance signal from the frequency converter by at least 1 horizontal synchronizing period, and a mixer circuit for mixing the reproduced chrominance signal supplied from the frequency converter and the delayed chrominance signal. The vectors of the input signal to the comb filter 6 are the same as those shown in FIG. 9. The crosstalk vectors in the adjacent two horizontal lines (e.g. the (m−4)th line and the (m−3)th line) are opposite to each other by 180°. For this reason, when adding the current signal and the previous signal 1 H period before in the comb filter 6, the adjacent crosstalk components are offset (canceled), thereby obtaining vectors in one direction without a cross component, as is shown in FIG. 10.

Thus, according to the structure shown in FIG. 5, the chrominance signal which has been subjected to phase recovery, frequency conversion, and noise removal can be obtained at the output terminal 7.

Structure of the Phase Recovery Circuit

The 0° phase shifter 18A and the 180° phase shifter 18C have a simple structure. The 0° phase shifter 18A is constructed by a buffer amplifier, while the 180° phase shifter 18C is constructed by an inventor type buffer amplifier, as is shown in FIGS. 11 and 12, respectively.

Each of the phase shifters in the phase recovery circuit 18 must satisfy the following conditions.

(1) The frequency characteristics between the input and output is flat.
(2) No delay time is generated other than the necessary amount of the phase shift.

Figure 3:
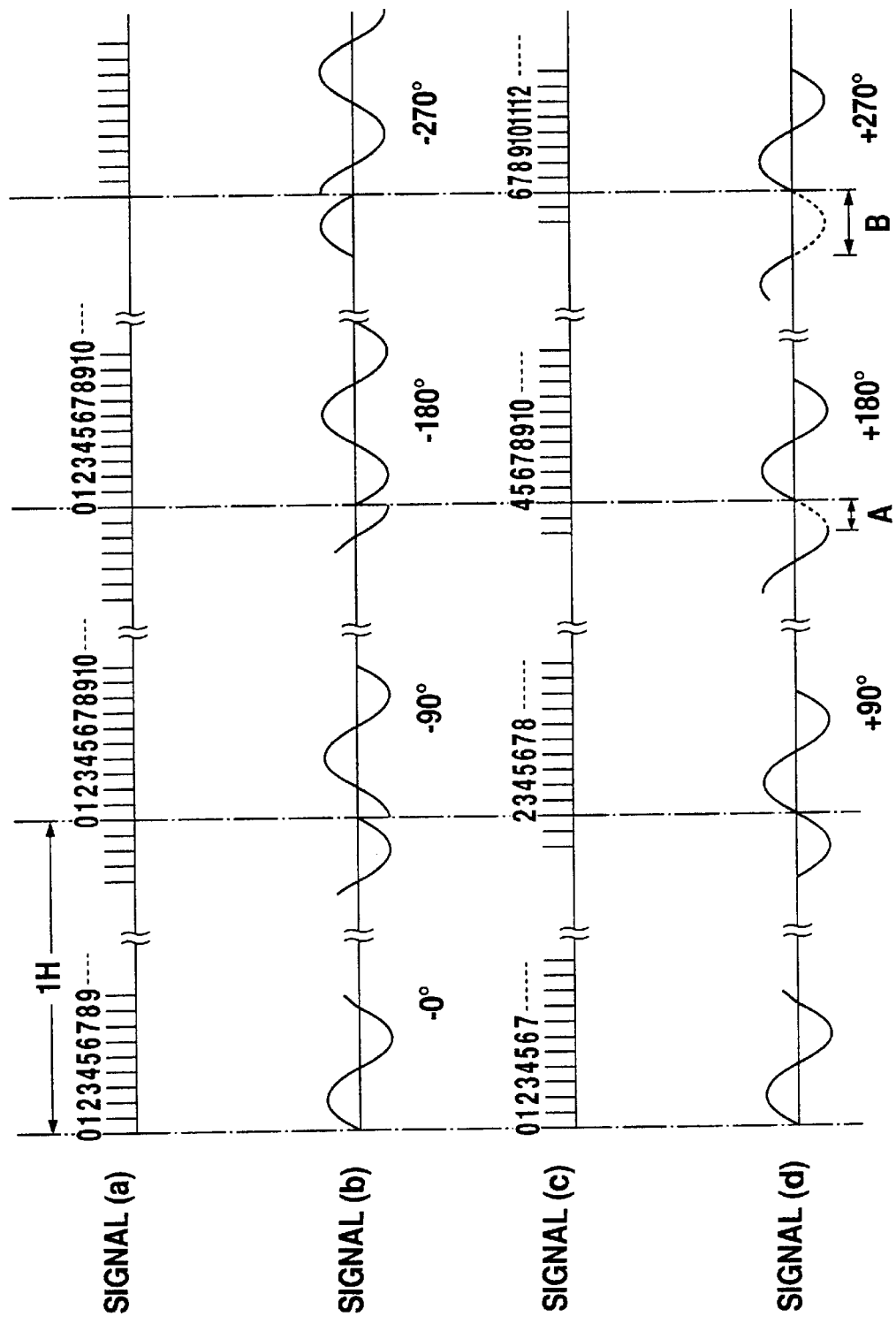
FIG. 3 illustrates write/readout timings and waveforms for the explanation of the circuit of FIG. 2.
Figure 4:
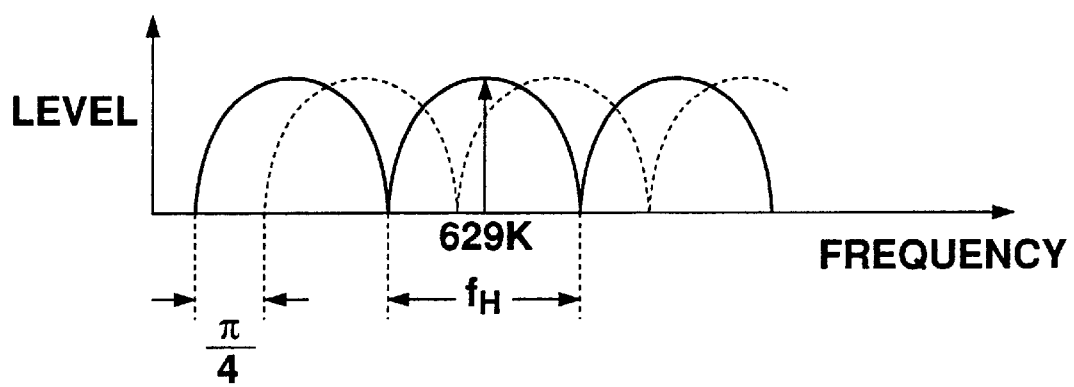
FIG. 4 illustrates frequency characteristics of a comb filter.

If a general integral circuit or differentiating circuit is used for the phase shifter, the above two conditions are not satisfied. A phase shifter meeting with the conditions is, for example, an APF (all pass filter) shown in FIG. 13, which has flat frequency characteristics between the input and output, and can carry out 90° of signal delay. Waveforms of the input and output of such a phase shifter (APF) are shown in FIGS. 14A and 14B, respectively. Namely, when the input signal having a waveform of FIG. 14A is supplied to the input terminal 50 of the APF, the output of the APF from the output terminal 51 has a waveform delayed by 90° and having the same shape, as is shown in FIG. 14B. However, during the period t1 to t2, response to the input signal $V_{IN}$ (that is, an output signal) can not be generated immediately after the signal input. This situation is equal to missing data shown by the dashed line in FIG. 3, which adversely affects the quality of the reproduced image.

Figure 15:
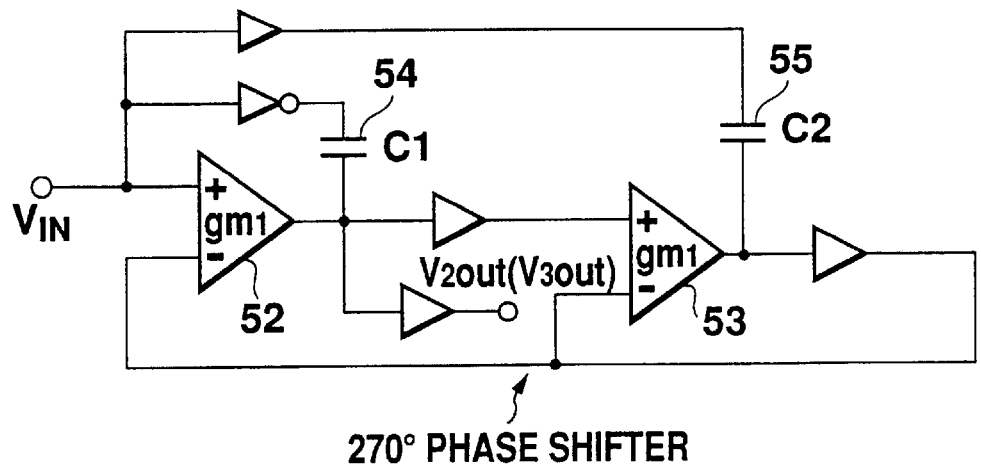
FIG. 15 shows an example of the 270° phase shifter circuit shown in FIG. 5.
Figure 16:
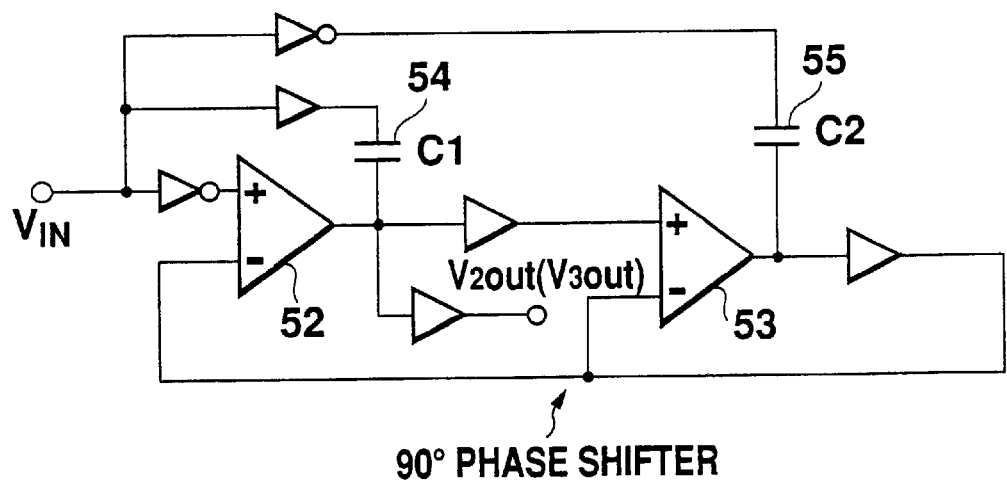
FIG. 16 shows an example of the 90° phase shifter circuit shown in FIG. 5.

In order to obtain an ideal waveform, a 270° phase shifter 18D for advancing 270° (i.e. for delaying 90°), the structure of which is shown in FIG. 15, and a 90° phase shifter 18B for advancing 90°, the structure of which is shown in FIG. 16, are proposed by the invention. The output of the 270° phase shifter 18D is shown in FIGS. 14D. Using the four circuits shown in FIGS. 11, 12, 15 and 16 for a phase recovery circuit 18, appropriate phase recovery can be achieved, and ideal filtering for noise removal can be carried out by the comb filter 6 in a later process.

As is shown in FIG. 15, the 270° phase shifter 18D includes first and second differential amplifiers 52 and 53, and capacitors 54 and 55. Assuming that the mutual conductances of the amplifiers 52 and 53 are gm1 and gm2, respectively, and that the capacitance of the capacitors 54 and 55 are C1 and C2, respectively, the transfer function H2 (ω) between the input and output of this circuit ($V_{IN}$–V2out) is represented by the following equation.

$$H_2(\omega) = \frac{V_{2OUT}}{V_{IN}} = \frac{-s^2 - \frac{gm_2}{C_2}s + \frac{gm_1 gm_2}{C_1 C_2}}{s^2 + \frac{gm_2}{C_2}s + \frac{gm_1 gm_2}{C_1 C_2}} \quad (5)$$

By the way, the APF shown in FIG. 13 and the 270° phase shifter 18D shown in FIG. 15 have substantially the same structure, but the location of the output terminals are different. Assuming that the characteristic values of the respective elements are equal between FIGS. 13 and 15, the transfer function H1(ω) between the input and output (Vin–V1out) of the circuit of FIG. 13 is represented by the following equation.

$$H_1(\omega) = \frac{V_{1OUT}}{V_{IN}} = \frac{s^2 - \frac{gm_2}{C_2}s + \frac{gm_1 gm_2}{C_1 C_2}}{s^2 + \frac{gm_2}{C_2}s + \frac{gm_1 gm_2}{C_1 C_2}} \quad (6)$$

From the equations (5) and (6), the transfer function H 2(ω) can be represented as follows.

$$H_2(\omega) = H_1(\omega) - \frac{2s^2}{s^2 + \frac{gm_2}{C_2}s + \frac{gm_1 gm_2}{C_1 C_2}} \quad (7)$$

The equation (7) is provided by adding the reversed (positive to negative) transfer function of the H PF multiplied by two to the equation (6). Accordingly, when depicting the equation (7) in an actual circuit, it is shown as FIG. 17. The portion A of the circuit of FIG. 17 constitutes an APF, and the, portion B constitute a typical HPF. When multiplying the output of the H PF by 2 by the amplifier (multiplier) 56 and inputting to the negative input terminal of the third differential amplifier 57, the overall structure of the circuit of FIG. 17 becomes equivalent to the equation (7). This circuit operates so that the HPF works for the transitional (initial) response and the APF works for the subsequent response. The output VH of the HPF is shown in FIG. 14C. Since the cutoff frequency of the HPF for the input signal is set high, a relatively high level output (differential output) is generated during the transitional response period (before t2), but it becomes very low after t2 because of the influence of the cutoff frequency, as is shown in FIG. 14C. On the contrary, the output of the APF (integral output) is not generated during the initial period t1–t2, but the signal delayed by 90° is generated at a desired level, as is shown in FIG. 14B.

Figure 17:
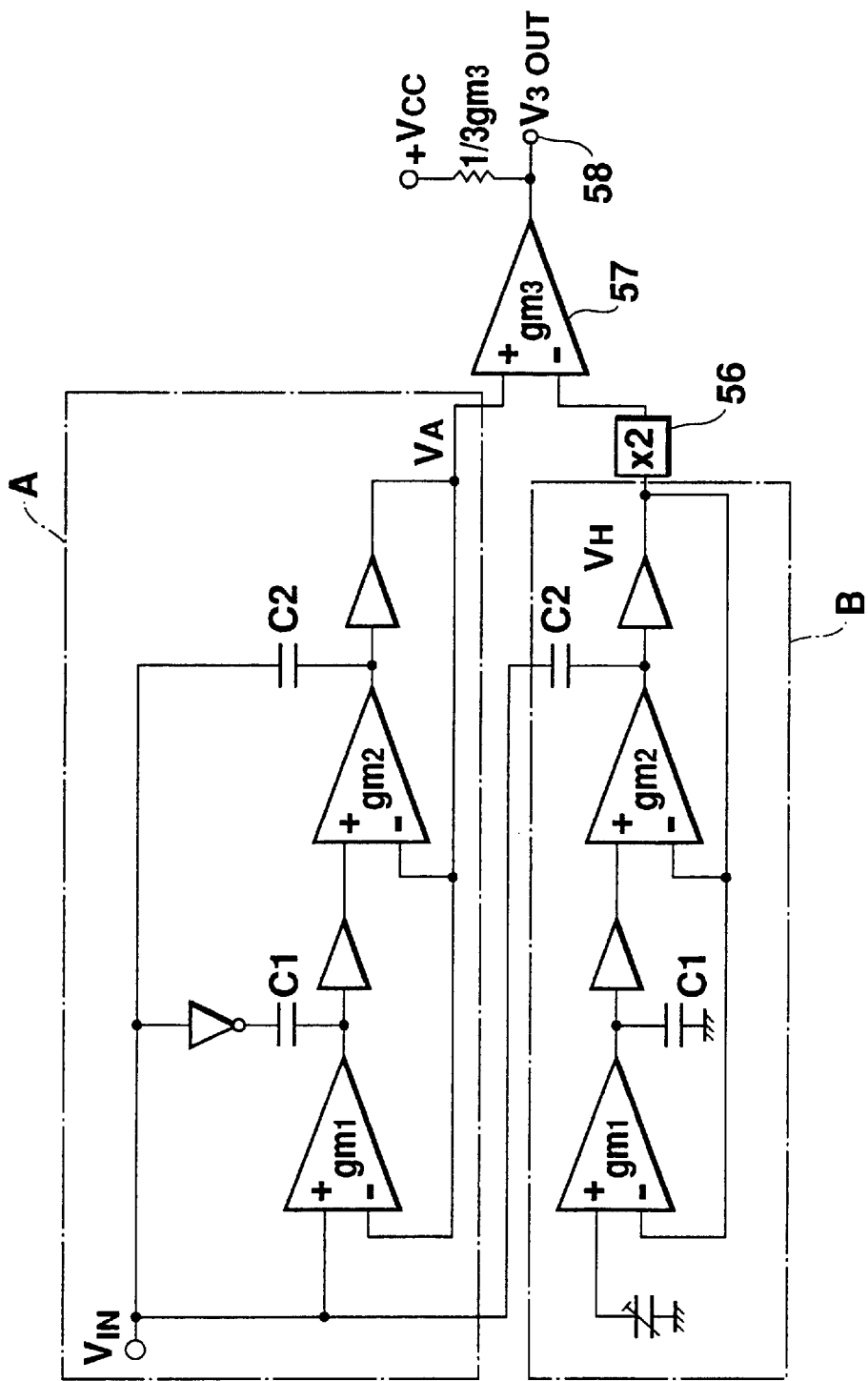
FIG. 17 shows a circuit equivalent to the circuit of FIG. 15.

In order to solve this defect, the signal VH of FIG. 14C is multiplied by 2 by the amplifier 56, reversed by the third differential amplifier 57, and added to the output terminal 58, as shown in FIG. 17, thereby obtaining the preferred output V3out at the output terminal of the whole circuit, having a waveform shown in FIG. 14D. Comparing the input Vin of the APH shown in FIG. 14A and the output V3out shown in FIG. 14D, it is found that the circuit shown in FIG. 15 (i.e. 270° phase shifter) satisfies the following conditions;

(a) the input signal can be delayed by 90 without data lack between signals; and (b) the frequency characteristic between the input and output is flat as a result of using the APF, which are in agreement with the above mentioned conditions.

The 90° phase shifter is shown in FIG. 16. The only difference from the circuit of FIG. 15 (and the circuit of FIG. 17 which is equivalent to FIG. 15) is that the input signal is reversed. The reversed input signal is shown in FIG. 18A. All of the explanation in connection with the 270° phase shifter in FIG. 15 is similarly applied to the 90° phase shifter of FIG. 16, and FIGS. 18B–18D correspond to FIGS. 14B–14D. Therefore, the circuit shown in FIG. 16 also satisfies the conditions (a) and (b), which is capable of transforming the input signal (FIG. 18A) to the output signal (FIG. 18D) having an ideal waveform shifted by 90° from the input signal.

As has been described, the phase of the input low frequency chrominance signal is recovered prior to the frequency conversion, and therefore, the oscillation signal output from the VCO is directly applied to the frequency converter, which allows an extra frequency converter and complicated BPF to be omitted.

Furthermore, the phase recovery circuit is constituted by four phase shifters (for 0°, 90°, 180°, and 270°), utilizing differentiation and integration, and a switch for switching those phase shifters, so that time delay does not occur even after phase shifting.

Second Embodiment

Figure 19:
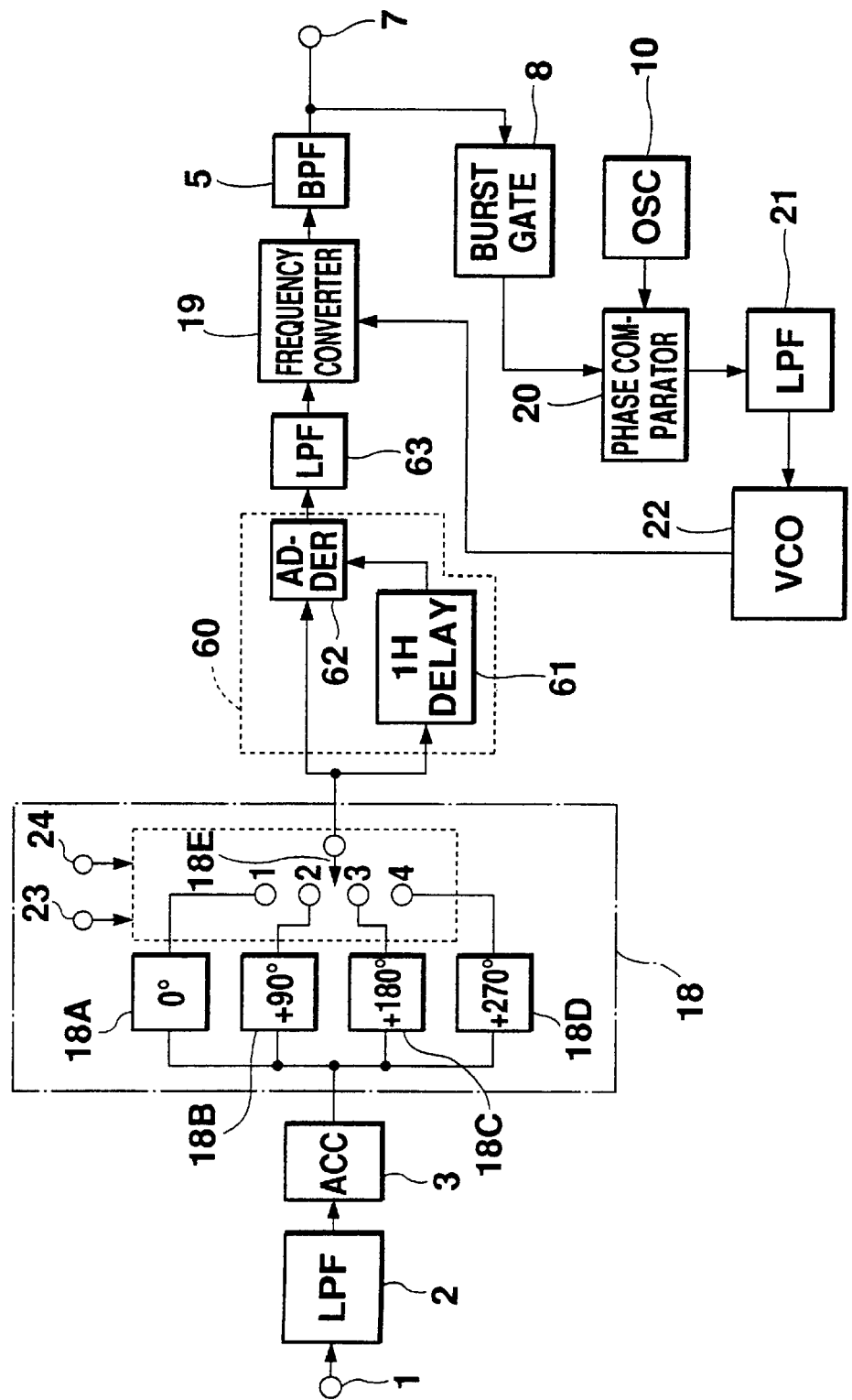
FIG. 19 is a block diagram of the video signal reproduction circuit in accordance with the second embodiment of the invention.

FIG. 19 shows a video signal reproduction circuit for NTSC format in accordance with the second embodiment of the invention. This circuit includes a phase recovery circuit 18 for recovering the phase of the input low frequency chrominance signal, comprising a 0° phase shifter 18A, 90° phase shifter 18B, 180° phase shifter 18C, 270° phase shifter 18D, and a switch 18E. A comb filter 60 connected to the phase recovery circuit 18 comprises a delay circuit 61 for delaying the output from the phase recovery circuit 18 by 1 horizontal period (1 H ) of a synchronizing signal, and an adder 62 for adding the output of the switch 18E and the output of the delay circuit 61. The output of the adder 62 is connected to the input to the LPF 63 for removing a leaked clock signal in the delay circuit 61 utilizing CCD, and then to the frequency converter 19.

Similar to the circuit of FIG. 5, this video signal reproduction circuit further includes a comparator 20 for comparing the output of the oscillation signal (3.58 MHz) output from the oscillator circuit 10 with the output signal of the burst extraction circuit 8 with respect to their phases. The output of the phase comparator is applied to the LPF 21 for smoothing. The oscillation frequency (4.21 MHz) of the VCO 22. varies in response to the output from the LPF 21.

A chrominance signal (629 KHz) which has been read out from the magnetic tape and input via an input terminal 1 is applied via an LPF 2 to an ACC (automatic chrominance controller) 3 for level adjustment. The level adjusted chrominance signal is supplied to the phase recovery circuit 18 for recovering the phase which has been rotated during recording. The phase recovering processing for the input low frequency chrominance signal is carried out in the same manner as the embodiment 1.

Since the phase recovery circuit 18 has already recovered the phases of the chrominance signals so as to have the same phase, the comb filter 60 can remove noise components by simply adding the current signal and the previous signal before the 1 H period and outputting the double level signal. For this reason, the comb filter 60 has a simple structure comprising only the delay circuit 61 and the adder 62. When the adder 62 adds the previous chrominance signal 1 H before, supplied from the delay circuit 61 utilizing CCD, to the current chrominance signal supplied from the phase recovery circuit 18, a preferred chrominance signal, from which noise components have been removed, can be obtained. The chrominance signal is then applied to the LPF 63 to remove the leakage of the clock signals in the delay circuit 61.

The chrominance signal having passed through the LPF 63 is supplied to the frequency conversion circuit 53 which simply carries out frequency conversion using a single frequency (4.21 MHz) without the necessity of phase recovery and can directly receive the oscillation signal (4.21 MHz) output from the VCO 22. The chrominance signal converted to 3.58 MHz is applied via a BPF 5 to the burst extraction circuit 8 for extracting only a burst component. The burst signal is applied to the phase comparator 21 in which the phase of the burst signal and the phase of the oscillation signal (3.58 MHz) from the fixed oscillator circuit 10 are compared. The comparison error voltage is supplied to the VCO 22 to control the oscillation frequency, thereby enabling stable frequency conversion.

Thus, in the phase recovery circuit 18 shown in FIG. 19, phase recovery is performed prior to the frequency conversion, which allows the structure of the comb filter 60 to be simplified. Since the frequency conversion circuit only carries out frequency conversion at a single frequency (4.21 MHz) without the necessity to conducting phase recovery, the oscillation signal of 4.21 MHz output from the VCO can be directly applied to the frequency conversion circuit 19.

In this manner, the reproduced chrominance signal, which has been subjected to phase recovery, frequency conversion and noise removal, can be provided to the output terminal 7 with a simple structure. The structure of the comb filter 60 used in this embodiment can also be applicable to the comb filter 60 used in the first embodiment (FIG. 5) for simplification of its structure.

Figure 1:
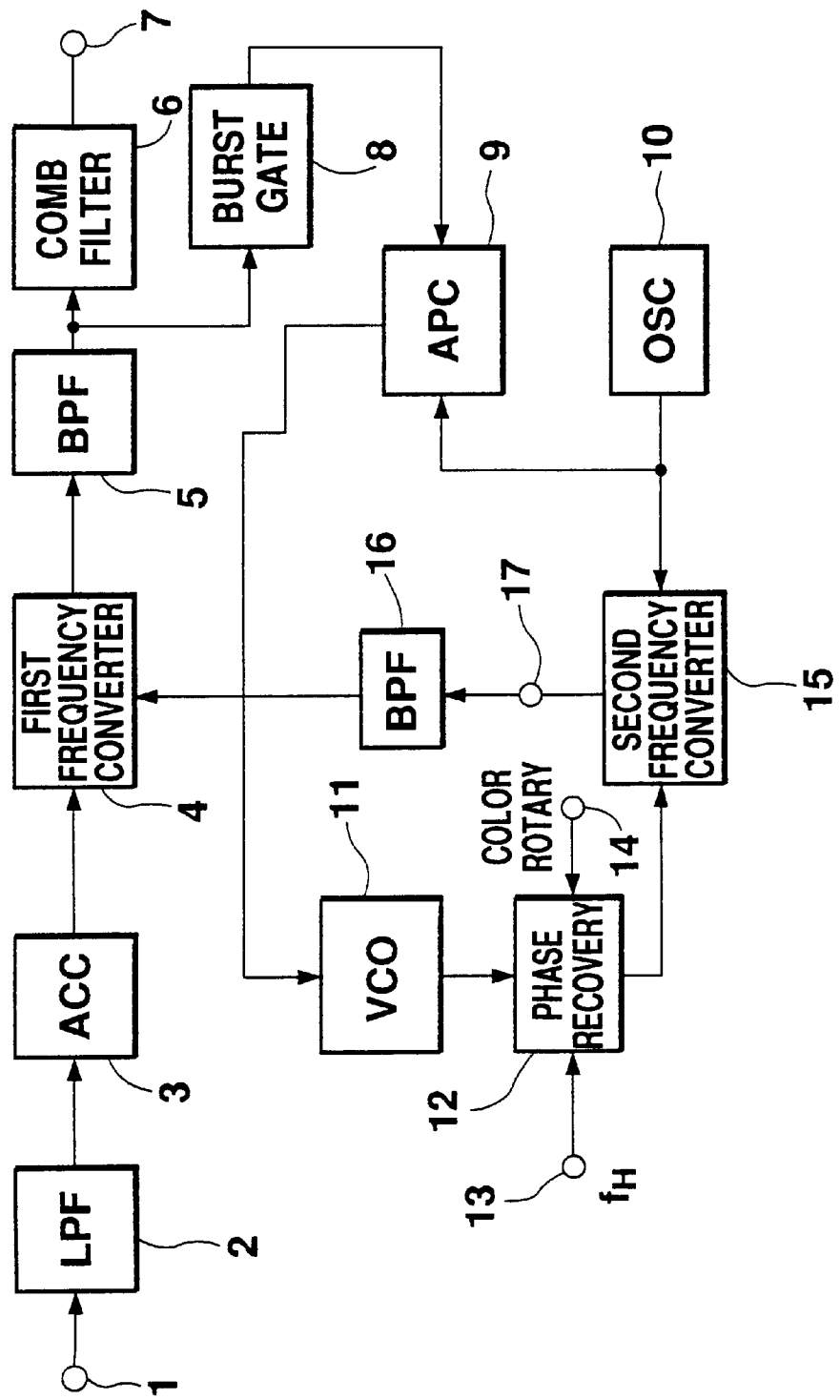
FIG. 1 is a block diagram showing a structure of a conventional video signal reproduction circuit.
Figure 2:
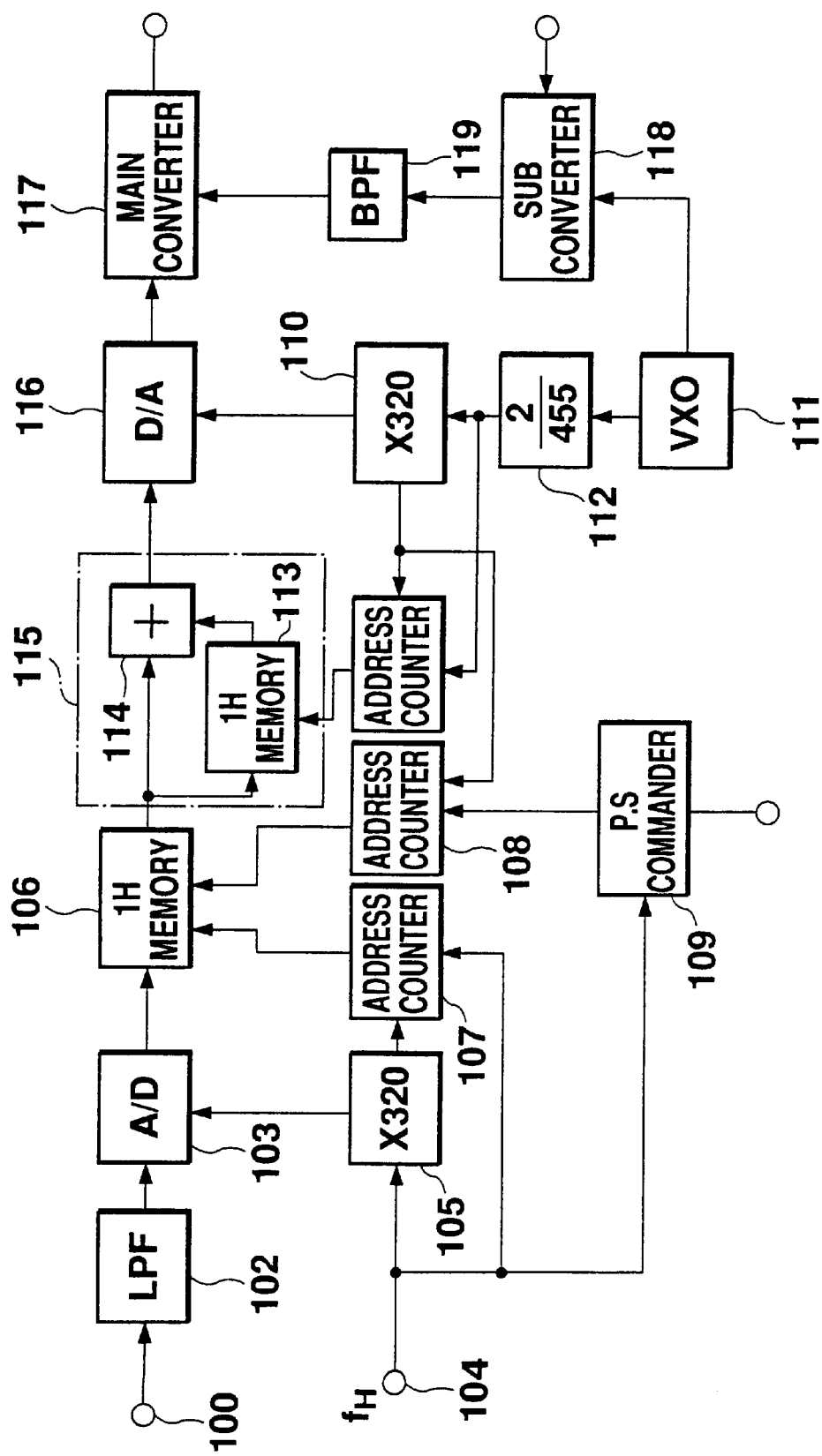
FIG. 2 is a block diagram showing an another example of a conventional video signal reproduction circuit.
Figure 20:
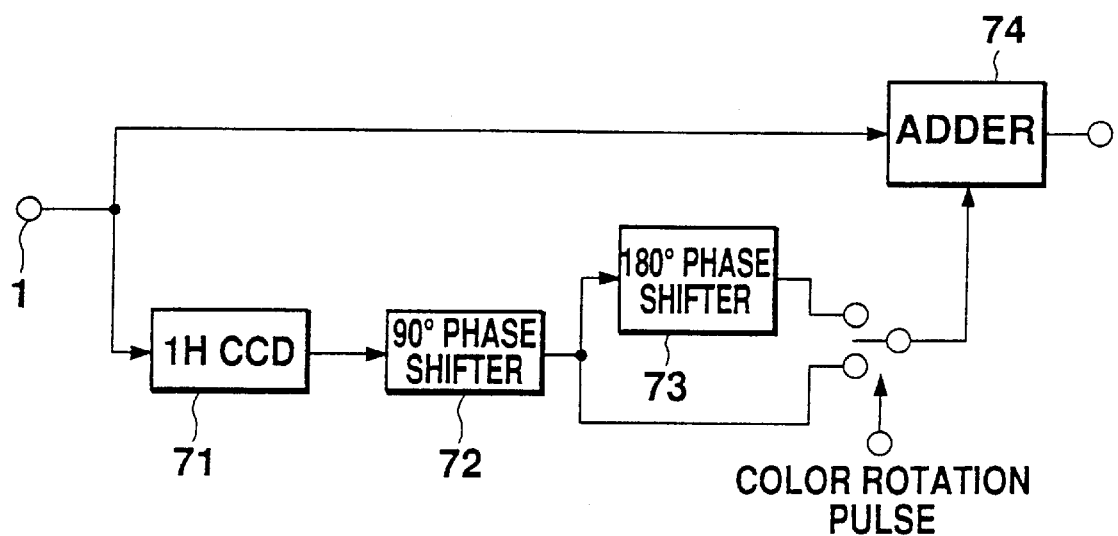
FIG. 20 shows a comb filter circuit used for the conventional video signal reproduction circuit for NTSC format.

The feature of this embodiment is that the comb filter 60 is located in front of the frequency converter 53, while, in the conventional circuit or in the first embodiment, the comb filter 60 is located behind the first frequency converter 4 or frequency converter 19. Although JPA 63-257394 discloses such a structure that the comb filter is connected in front of the first frequency converter, that comb filter includes an increased number of elements as is shown in FIG. 20. Namely, the 90° phase shifter 72 and the 180° phase shifter 73 are connected between the 1 H delay 71 and the adder 74, and the adder 74 receives either a chrominance signal which has been delayed 1 H and phase-shifted by 90° or a signal which has been delayed 1 H and phase-shifted by 270°. This results from the fact that the phase of the low frequency chrominance signal input to the comb filter has not been recovered yet. In order to carry out the phase recovery processing, the circuit of JPA 63-257394 will require such a complicate structure as is shown in FIG. 1 at a later stage than the comb filter.

Third Embodiment

Figure 21:
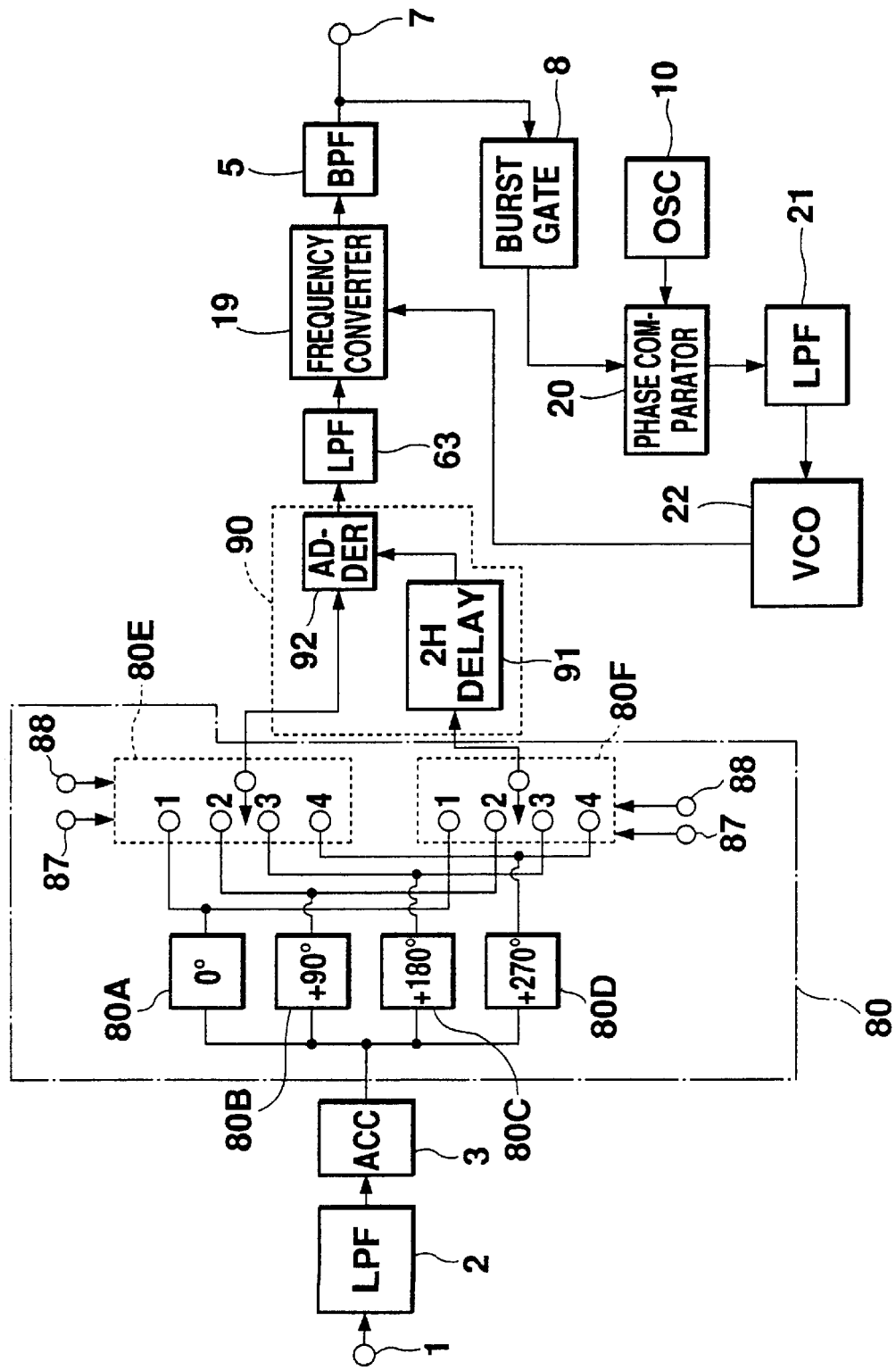
FIG. 21 is a block diagram of the video signal reproduction circuit in accordance with the third embodiment of the invention.

FIG. 21 shows a video signal reproduction circuit for PAL format in accordance with the third embodiment of the invention. This circuit includes a phase recovery circuit (a phase shifter) 80 for recovering the phase of the input low frequency chrominance signal, comprising a 0° phase shifter 80A, a 90° phase shifter 80B, a 180° phase shifter 80C, 270° phase shifter 80D, and first and second switches 80E and 80F. Each of the phase shifters 80A–80D has the same structure as the phase shifters 18A–18D described in the first embodiment. A comb filter 90 comprises a delay circuit 91 for delaying the output from the phase recovery circuit 80 by 2 horizontal periods (2 H ) of the synchronizing signal, and an adder 92 for adding the output of the first switch 80E and the output of the delay circuit 91. The output of the adder 2 is connected to the input to the LPF 63 for removing a leaked clock signal in the delay circuit 61 utilizing CCD, and then to the frequency converter 19 which converts the frequency of the signal to 4.43 MHz. The video signal reproduction circuit further includes a phase comparator 20 for comparing the output of the oscillation signal (4.43 MHz) output from the oscillator circuit 10 with the output signal of the burst extraction circuit 8 with respect to their phases. The output of the phase comparator is applied to the LPF 21 for smoothing. The oscillation frequency (5.06 MHz) of the VCO 22 varies in response to the output from the LPF 21.

A chrominance signal (627 KHz) which has been read out from the magnetic tape and input through an input terminal 1 is applied via a LPF 2 to an ACC (automatic chrominance controller) 3 for level adjustment. The level adjusted chrominance signal is supplied to the phase recovery circuit 80 for recovering the phase of the signal which has been rotated during recording.

Figure 22:
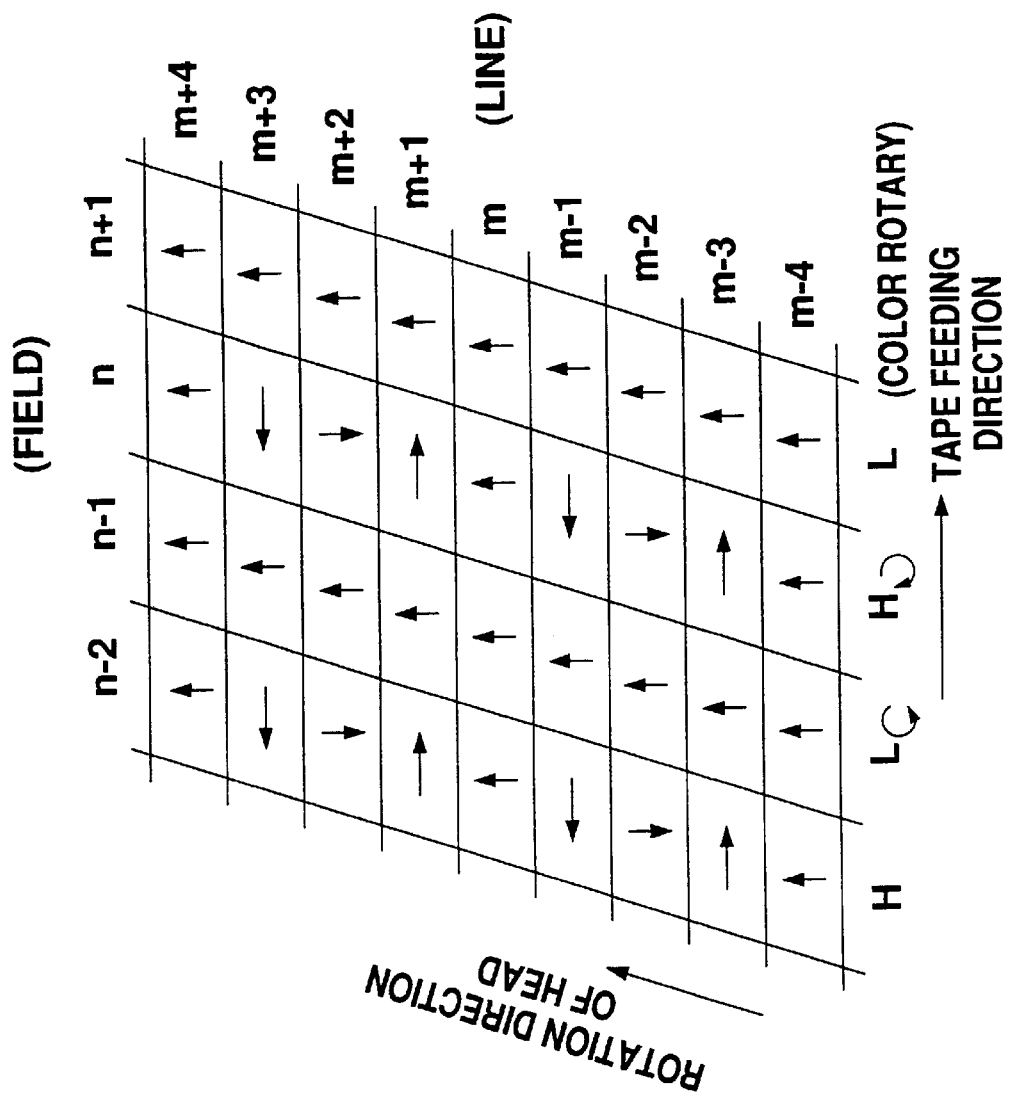
FIG. 22 shows phase vectors of a low frequency chrominance go signal recorded in a different format from that of FIG. 6.

The phases of the signals recorded on the magnetic tape in PAL format are indicated by vectors in FIG. 22. The phases of data in every two fields are rotated by 90° every 1 H in the delayed direction according to the rotation of the cylindrical record head, where a color rotary pulse is L. On the other hand, the phases of data in the other fields direct in a constant direction, where a color rotary pulse is H).

Figure 23:
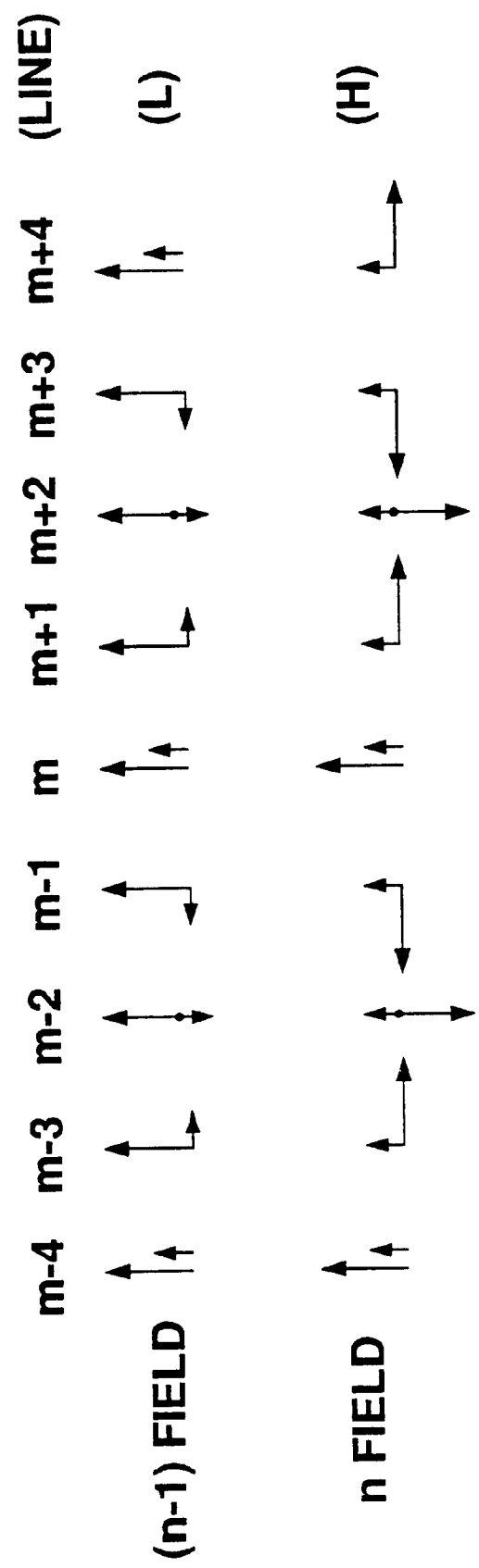
FIG. 23 shows phase vectors of FIG. 22 in more detail.

FIG. 23 shows vectors of the chrominance signals together with the crosstalk components for the (n−1) field and the n field between the (m−4)th line and the (m+4)th line. The small arrows represent adjacent crosstalk components. In the "n" field, the signal is delayed by 90° per 1 H period, where the color rotary pulse is "H". In the (n−1) field, the vectors of the signals direct constantly in the direction of 90°, where the color pulse is "L". The color rotary pulse is supplied to the terminal 87 (FIG. 21) to direct the switching direction of the first and second switches 18E and 18F, while a horizontal synchronizing signal is supplied to the terminal 88 (FIG. 21) to set the switching period to 1 H .

Figure 25:
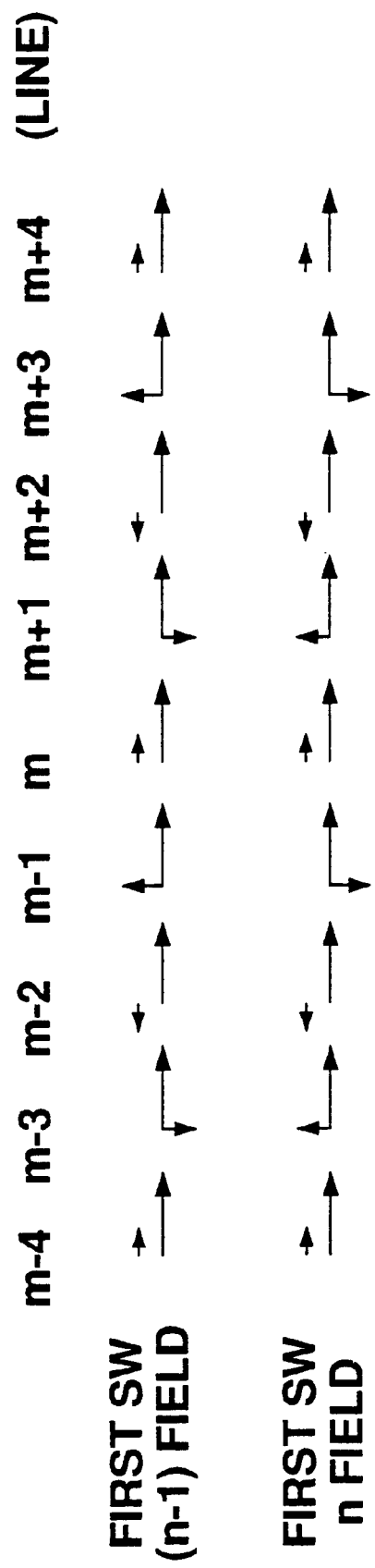
FIG. 25 shows phase vectors of the phase recovered chrominance signal in accordance with the third embodiment of the invention.

FIG. 24 is a table showing the switching state of the first and second switches 18E and 18F. In the (n−1) field where the color rotary pulse is "L", the first switch 80E selects the terminal 4 for the (m−4)th line to operate the 270° phase shifter 80D, whereby the vector of the chrominance signal which has passed through the first switch 80E directs 0° as is shown in FIG. 25. The first switch 80E keeps selecting the terminal 4, and therefore, all the vectors of the chrominance signal in the (n−1) field direct in the 0° direction.

During this operation, the second switch 80F keeps selecting its terminal 1 (see FIG. 24), and always the signal which as passed through the 0° phase shifter is applied to the comb filter 90. Accordingly, all the chrominance signal in the (n−1) field have the same phase.

In the n field where the color rotary pulse is "H", the first switch selects the terminal 4 for the (m−4)th line to operate the 270° phase shifter 80D, whereby the vector of a phase recovered chrominance signal which has passed through the first switch 80E directs in a 0° direction at the (m−4)th line in the "n" field, as is shown in FIG. 25. For the next line (the (m−3)th line), the first switch 80E selects the terminal 1 to operate the 0° phase shifter 80A, whereby the vector of the signal having passed through the first switch 80E directs in the 0° direction. The first switch 80E successively selects the terminals in the order of 2→3→4→1. As a result, all the vectors of chrominance signals in the "n" field, which have passed through the first switch 80E, direct in the same direction (0°), and phase recovery is completed.

Figure 26:
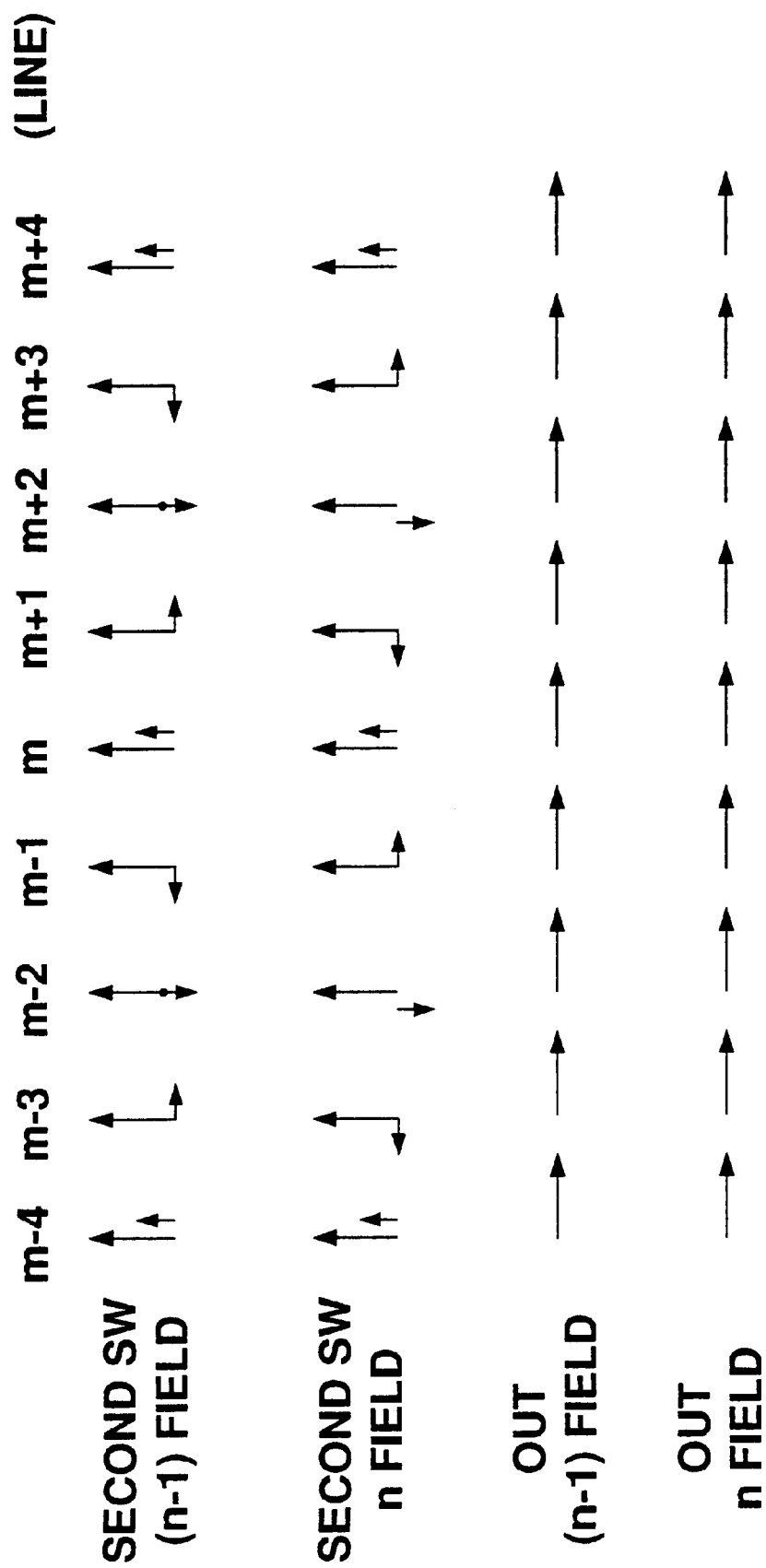
FIG. 26 shows phase vectors for explaining the operation of the comb filter of the third embodiment.

During this operation, the second switch 80E successively selects the terminals in the order of 1→2→3→4→1, and the phases of all the chrominance signals are recovered in the same direction (90°), as is apparent from FIG. 26.

Since the frequency of the low band converted chrominance signal for PAL format is 40.125fH (=627 KHz), a signal delayed by 2 H period is added to the current signal having passed through the first switch, which means that the phase of the signal to be delayed is advanced by 90° from the current signal. More particularly, the vector of the signal at the (m−2)th line for the first switch is in a 0° direction, while the vector of the signal for the second switch at the (m−4)th line, which is 2 H period before, is advanced by 90°.

Similar to the second embodiment, phase recovery followed by noise removal by the comb filter, is carried out prior to frequency conversion. Because of the operation of the phase recovery circuit 80 which is located in front of the comb filter 90, the comb filter 90 has a simple structure including only a 2 H delay circuit 91 utilizing a CCD and an adder 92.

The 2 H delay circuit 91 delays the signal from the second switch 80F, the phase of which is advanced by 90°, by 2 H periods and supplies the delayed signal to the adder 92, which adds the delayed signal to the current chrominance signal supplied directly from the first switch 80E. As a result, the output of the comb filter 90 has the same phase as the original signal, as is apparent from FIG. 26.

Figure 27:
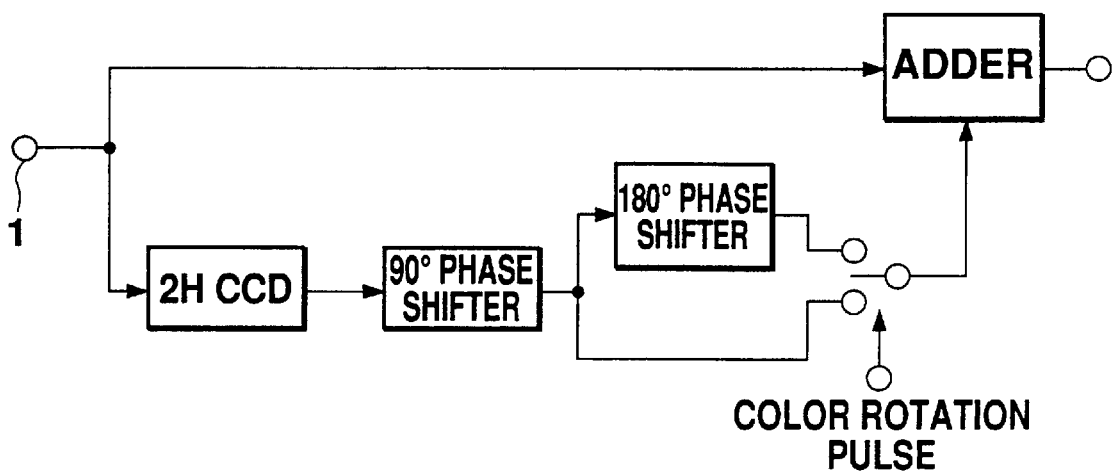
FIG. 27 shows a comb filter used for the conventional video signal reproduction circuit for PAL format.

As has been mentioned, JPA63-257394 proposes a structure where the comb filter is located in front of the frequency converter. However, in this structure, phase recovery has not been carried out before the comb filtering. For this reason, of employing this structure for PAL format, the comb filter becomes complicated as is shown in FIG. 27 due to the phase shift of the input chrominance signal. This invention proposes a simple comb filter, and the clock rate of the CCD used for the delay circuit in the comb filter can be made slow. Furthermore, the frequency converter 19 does not need to carry out phase recovery, and simply performs frequency conversion at a single frequency (5.05. MHz), having a direct input from the VCO 56 which oscillates at 5.06 MHz.

The chrominance signal converted to 4.43 MHz by the frequency converter 19 is applied via the BPF 5 to the burst extraction circuit 8. Only the burst component of the signal is applied to the phase comparator 20, and is compared with the oscillation signal (4.43 MHz), output from the fixed oscillation circuit, with respect to their phases. The comparison error voltage is supplied to the VCO 56 to control the oscillation frequency. Thus, the phase of the output of the frequency converter 19 is synchronized with the phase of the output of the oscillator 10, and stable frequency conversion is achieved. As a result, a preferred reproduced chrominance signal can be output from the output terminal 7, which has been subjected to phase recovery, noise removal and frequency conversion.

What is claimed is:

1. A video signal reproduction apparatus for a chrominance signal which has been converted to a low frequency band and recorded on a magnetic tape, said video signal reproduction apparatus comprising:

a phase recovery circuit, the phase recovery circuit receiving a first frequency chrominance signal read out from the magnetic tape and recovering the phase of the first frequency chrominance signal to generate a phase recovered chrominance signal;

a frequency converter, the frequency converter receiving the already phase recovered grist frequency chrominance signal that has passed through the phase recovery circuit and converting the frequency of the phase recovered first frequency chrominance signal to generate a second frequency reproduced chrominance signal, wherein the first frequency chrominance signal read out from the magnetic tape is received by the phase recovery circuit before passing through the frequency converter and the first frequency is lower than the second frequency an oscillator which oscillates at a burst signal frequency, and a phase controller including a phase comparator for comparing the phase of a burst component of the reproduced chrominance signal with the oscillation signal from the oscillator, a filter for smoothing the comparison signal form the phase comparator, and a voltage controlled oscillator having an oscillation frequency that varies in response to the output form the filter, the output of the voltage controlled oscillator controlling the frequency conversion in the frequency converter.

2. The video signal reproduction apparatus according to claim 1, further comprising a comb filter for removing noise components from the reproduced chrominance signal.

3. The video signal reproduction apparatus according to claim 2, wherein said comb filter includes a delay circuit for delaying the reproduced chrominance signal from the frequency converter by at least 1 horizontal synchronizing period, and a mixer circuit for mixing the reproduced chrominance signal supplied from the frequency converter and the delayed chrominance signal.

4. The video signal reproduction apparatus according to claim 1, wherein said phase recovery circuit comprises a 0° phase shifter for shifting the phase of an output signal by 0° from the phase of an input signal, a 90° phase shifter, a 180° phase shifter, a 270° phase shifter, and a switch member for switching these phase shifters.

5. The video signal reproduction apparatus according to claim 4, wherein said 180° phase shifter comprises an inverter for inverting an input signal and outputting the inverted signal.

6. The video signal reproduction apparatus according to claim 4, wherein said 90° phase shifter and said 270° phase shifter have a phase shifting function for shifting the phase of a signal by 90° and a high pass filter function for differentiating and passing an input signal.

7. A video signal reproduction apparatus for a chrominance signal which has been converted to a low frequency band and recorded on a magnetic tape, said video signal reproduction apparatus comprising:

a phase recovery circuit, a frequency converter, wherein a first frequency chrominance signal is read out from the magnetic tape, is passed through the phase recovery circuit before passing through the frequency converter in order to recover the phase of the first frequency chrominance signal, and is then passed through the frequency converter in order to convert the frequency of the first frequency chrominance signal, which has previously been phase recovered, to generate a second frequency reproduced chrominance signal the first frequency being lower than the second frequency an oscillator which oscillates at a burst signal frequency, and a phase controller including a phase comparator for comparing the phase of a burst component of the reproduced chrominance signal with the oscillation signal from the oscillator, a filter for smoothing the comparison signal form the phase comparator, and a voltage controlled oscillator having an oscillation frequency that varies in response to the output form the filter, the output of the voltage controlled oscillator controlling the frequency conversion in the frequency converter.

8. A video signal reproduction apparatus for a chrominance signal which has been converted to a low frequency band and recorded on a magnetic tape, said video signal reproduction apparatus comprising:

an input terminal that receives a first frequency chrominance signal read out from the magnetic tape;

a phase recovery circuit that recovers the phase of the first frequency chrominance signal to generate a phase recovered chrominance signal;

a frequency converter that converts the frequency of the phase recovered first frequency chrominance signal to generate a second frequency reproduced chrominance signal;

an output terminal that receives the second frequency reproduced chrominance signal, wherein the input terminal, the phase recovery circuit, the frequency converter, and the output terminal are coupled in series such that the chrominance signal passes through the phase recovery circuit before passing through the frequency converters so that the chrominance signal is phase recovered before reaching the frequency converter, the first frequency being lower than the second frequency an oscillator which oscillates at a burst signal frequency, and a phase controller including a phase comparator for comparing the phase of a burst component of the reproduced chrominance signal with the oscillation signal from the oscillator, a filter for smoothing the comparison signal form the phase comparator, and a voltage controlled oscillator having an oscillation frequency that varies in response to the output form the filter, the output of the voltage controlled oscillator controlling the frequency conversion in the frequency converter.

* * * * *